(12) United States Patent
Shimokawa et al.

(10) Patent No.: US 7,711,380 B2
(45) Date of Patent: May 4, 2010

(54) POC COMMUNICATION SERVER APPARATUS, TERMINAL APPARATUS AND POC COMMUNICATION METHOD

(75) Inventors: Atsushi Shimokawa, Yokohama (JP); Naomasa Yoshida, Yokohama (JP); Atsushi Sato, Yokohama (JP); Yosuke Hayashi, Yokosuka (JP)

(73) Assignee: NTT DoCoMo, Inc., Chiyoda-ku (JP)

( * ) Notice: Subject to any disclaimer, the term of this patent is extended or adjusted under 35 U.S.C. 154(b) by 913 days.

(21) Appl. No.: 11/372,162

(22) Filed: Mar. 10, 2006

(65) Prior Publication Data

US 2006/0234692 A1    Oct. 19, 2006

(30) Foreign Application Priority Data

Mar. 14, 2005   (JP)   ............................. 2005-071236
Feb. 9, 2006    (JP)   ............................. 2006-032641

(51) Int. Cl.
*H04B 7/00*   (2006.01)

(52) U.S. Cl. ...................... 455/518; 455/519; 455/416; 455/418; 379/202.01; 370/260

(58) Field of Classification Search ................ 455/518, 455/519, 416, 418; 370/260, 261, 270, 389, 370/395.2; 379/202.01, 88.19
See application file for complete search history.

(56) References Cited

U.S. PATENT DOCUMENTS

| 2002/0110227 | A1 | 8/2002 | Bedingfield et al. |
| 2005/0100008 | A1 | 5/2005 | Miyata et al. |
| 2005/0144485 | A1* | 6/2005 | Mousseau .................. 713/202 |

(Continued)

FOREIGN PATENT DOCUMENTS

JP    08-167895 A    6/1996

(Continued)

OTHER PUBLICATIONS

"Push to talk over Cellular (PoC)—Architecture, Draft Version 1.0—Mar. 8, 2008" Open Mobile Alliance, p. 37, Mar. 8, 2005, OMA-AD_PoC-V1_0-20050308-D.

(Continued)

*Primary Examiner*—Matthew D Anderson
*Assistant Examiner*—Shaima Q Aminzay
(74) *Attorney, Agent, or Firm*—Crowell & Moring LLP

(57) ABSTRACT

Subject to user's setting in PoC group communication, the user address of that user is set to non notification against other users. In case of starting PoC group communication, a PoC subscriber selects non notification subjects and transmits a PoC session commencement request. At that time, the caller sets his own address and/or address/addresses of all or a part of users to non notification. On a user designated as a non notification subject due to the caller's setting, PoC terminal apparatuses in receipt of a PoC session commencement request or PoC communication service controlling apparatuses undergo non notification setting processing. On a called party not selected as non notification subject users, if he/she sets his/her own user address to non notification in advance, likewise non notification processing is implemented. Even after a PoC session is established, each user can set his/her own user address to non notification and non notification service complying with user's intention is providable.

15 Claims, 21 Drawing Sheets

U.S. PATENT DOCUMENTS

| | | | |
|---|---|---|---|
| 2005/0259675 A1* | 11/2005 | Tuohino et al. | 370/426 |
| 2005/0265313 A1* | 12/2005 | Poikselka | 370/352 |
| 2005/0276268 A1* | 12/2005 | Poikselka et al. | 370/395.2 |
| 2008/0181383 A1* | 7/2008 | Ohno et al. | 379/202.01 |

FOREIGN PATENT DOCUMENTS

| | | |
|---|---|---|
| JP | 2004-228829 A | 8/2004 |
| WO | WO 2006/000916 A1 | 1/2006 |

OTHER PUBLICATIONS

Rosenberg et al., "SIP: Session Initiation Protocol", p. 171, Jun. 2002, RFC 3261, IETF.

Open Mobile Alliance et al. : "Push To Talk over Cellular (PoC)—Architecture, Draft Version 1.0" Announcement Open Mobile Alliance, XX, XX, Jun. 8, 2004, XP002347530.

Peterson Neustar J: : A Privacy Mechanism for the Session Initiation Protocol (SIP); rfc3232.txt IETF Standard, Internet Engeneering Task Force, IETF, CH, Nov. 2002, XP015009091.

European Search Report dated May 26, 2006 (Six (6) Pages).

"Push to Talk Over Cellular (PoC) Charter", Oct. 14, 2003, OMA-Charter_PoC-V1_0-20031014-A, *OMA (Open Mobile Allicance)*, pp. 1-3.

"Push to Talk Over Cellular Requirements", Version 1.0-15, Nov. 2004, OMA-RD_PoC-V1_0-20041115-C, *OMA (Open Mobile Alliance)*, p. 1-76.

European Search Report.

Jennings, C. et al; "Private Extensions to the Session Initiation Protocol (SIP) for Asserted Identity within Trusted Networks; rfc3325. txt" Network Working Group, Nov. 2002 , XP000863945, 18 pages.

* cited by examiner

FIG. 10

| PRESENCE OF USER ADDRESS NON NOTIFICATION (O/×)<br>O···ALL USERS ARE SET TO NON NOTIFICATION<br>×···NON NOTIFICATION PROCESSING IS NOT CARRIED OUT | | PRESENCE OF TERMINAL'S OWN USER ADDRESS NON NOTIFICATION SETTING<br>PRESENCE OF NON NOTIFICATION SETTING<br>···TERMINAL'S OWN ADDRESS NON NOTIFICATION SETTING REQUEST IS TRANSMITTED<br>ABSENCE OF NON NOTIFICATION SETTING<br>···TERMINAL'S OWN ADDRESS NON NOTIFICATION SETTING REQUEST IS TRANSMITTED | |
|---|---|---|---|
| | | PRESENCE OF NON NOTIFICATION SETTING | ABSENCE OF NON NOTIFICATION SETTING |
| NON NOTIFICATION SETTING BY CALLER ON PoC SESSION COMMENCEMENT REQUEST (INVITE)<br>PRESENCE OF NON NOTIFICATION SETTING<br>···NON NOTIFICATION SUBJECTS ARE SELECTED AT THE TIME OF CALLING<br>ABSENCE OF NON NOTIFICATION SETTING<br>···NON NOTIFICATION SUBJECTS ARE NOT SELECTED AT THE TIME OF CALLING | PRESENCE OF NON NOTIFICATION SETTING | O | O |
| | ABSENCE OF NON NOTIFICATION SETTING | O | × |

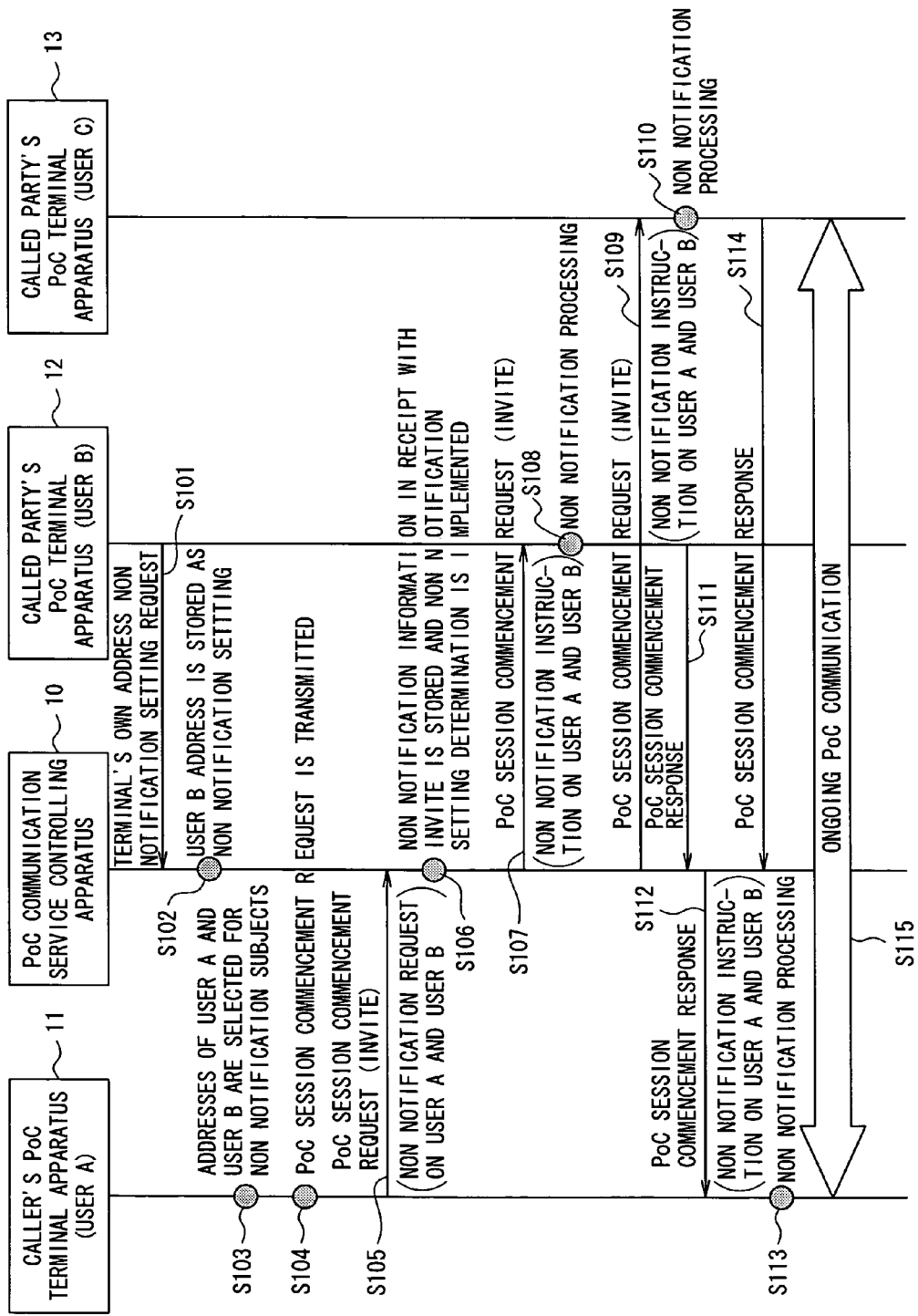

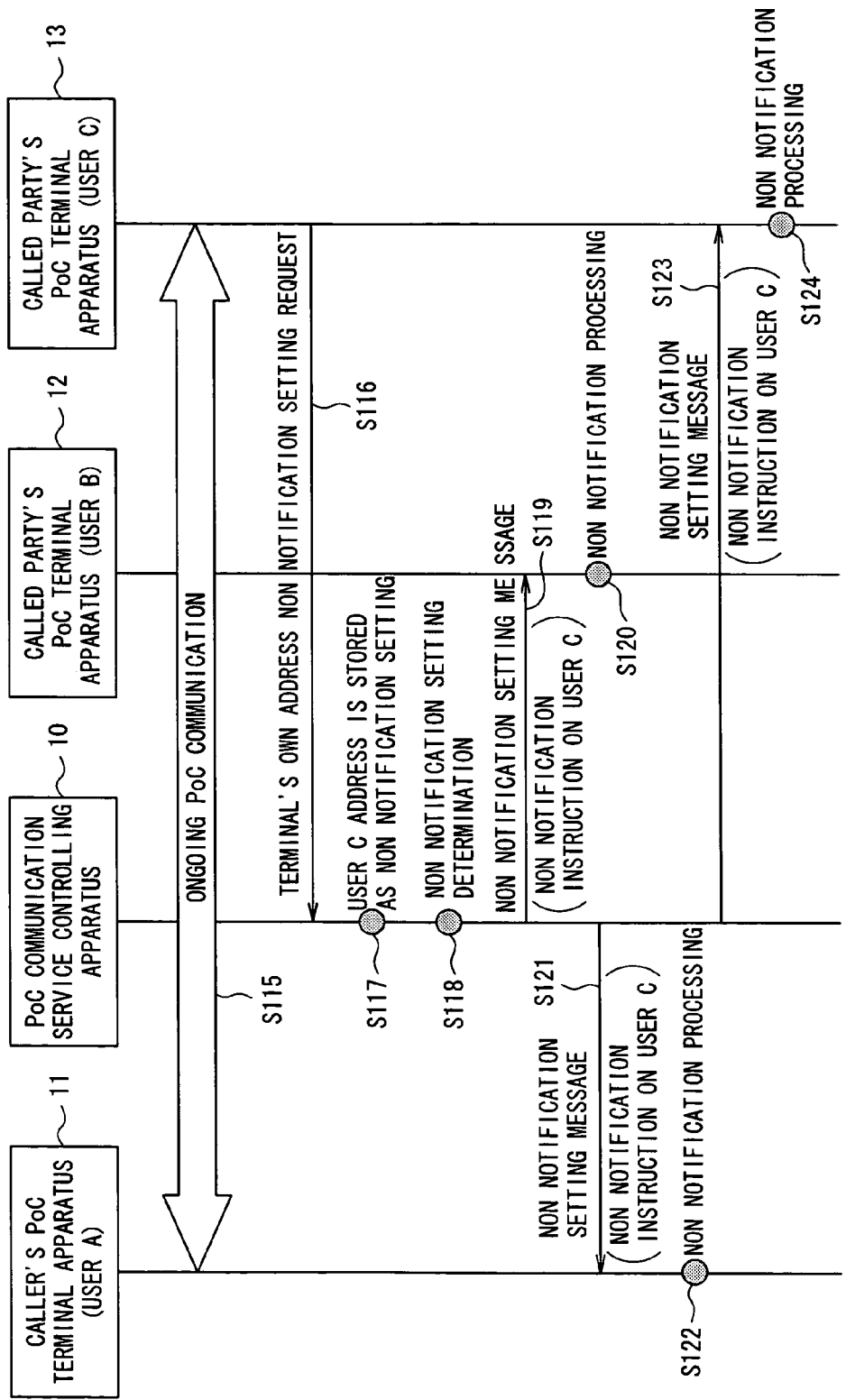

POC COMMUNICATION SERVER APPARATUS, TERMINAL APPARATUS AND POC COMMUNICATION METHOD

BACKGROUND OF THE INVENTION

1. Field of the Invention

The present invention relates to a PoC communication server apparatus, a terminal apparatus and a PoC communication method, and in particular relates to a PoC communication server apparatus, a terminal apparatus and a PoC communication method for realizing PoC communication in utilization of a terminal apparatus like a transceiver.

2. Description of the Related Art

There planned is realization of PoC (Push-to-Talk over Cellular) communication of enabling use of a terminal apparatus such as a cellular phone and the like a transceiver to realize communication just by touching buttons.

PoC communication is rapid one-to-one or intergroup communication and with PoC communication a terminal apparatus can be utilized like a transceiver. An operation for starting conversation is a simple operation of not pushing dial buttons but pushing a particular button.

Currently, in OMA (Open Mobile Alliance) being an industry organization of promoting standardization of mobile application technologies, standardization is under way (OMA-RD_PoC-V1_0-20041115-C) based on the PoC Charter (OMA-CHARTER_PoC-V1_0-20031014-A).

However, in the specification stipulated at the present stage, no method of setting a destination address, that is, a user address of a user called by a caller as non notification and no technology for processing in accordance with non notification setting is present. Accordingly, there is a concern that a user address that does not want to be disclosed might be disclosed and nevertheless there are no means to protect user's privacy.

The present invention is attained in order to solve the above described problems of the prior arts and an object hereof is to provide a PoC communication server apparatus, a terminal apparatus and a PoC communication method capable of hiding a user's address from another user (employing non notification) subject to user's setting in PoC group communication.

SUMMARY OF THE INVENTION

A PoC communication server apparatus according to claim 1 of the present invention is a PoC communication server apparatus for carrying out a PoC group session of realizing group talk with a terminal apparatus, comprising non notification command obtaining means for obtaining non notification command for employing non notification on a user address corresponding with a terminal apparatus included in the above described PoC group and non notification setting means for transmitting to another terminal apparatus a non notification setting command for setting non notification on to a user address related to the above described non notification command obtained by the above described non notification command obtaining means against the another terminal apparatus included in the above described PoC group. With such a configuration, user addresses of all members of a group or a part of a group can be hidden from all the group members (set to non notification).

The PoC communication server apparatus according to claim 2 of the present invention is provided, in claim 1, in which the above described non notification command obtaining means obtain the above described non notification command inclusive of the above described non notification setting information from another apparatus in the case where non notification setting information indicating whether or not respective user addresses of terminal apparatuses included in the above described PoC group are set to non notification is managed over a plurality of apparatuses. In the case where non notification setting information is managed over a plurality of PoC communication service controlling apparatuses, one of those apparatuses obtains non notification setting information from another apparatus and transmits it to a terminal apparatus, and then non notification processing can be realized also in case of realizing group talk among terminal apparatuses from different communication service providers.

The PoC communication server apparatus according to claim 3 of the present invention is provided, in claim 1, in which the above described non notification setting command includes a user address and an identifier of indicating whether or not the above described user address is set to non notification. The terminal apparatus can be caused to display contents indicative of non notification on a user address by means of transmitting together with the user address an identifier indicating whether or not to set it to non notification.

The PoC communication server apparatus according to claim 4 of the present invention is provided, in claim 1, in which the above described non notification setting command includes a user address and DISPLAYNAME information indicating contents to be displayed, instead of the above described user address, in display windows of respective PoC terminal apparatuses. Not displaying the user address but by transmitting the contents to be displayed instead, the terminal apparatus will only have to display those contents.

The PoC communication server apparatus according to claim 5 of the present invention is provided, in claim 1, in which the above described non notification setting command does not include a user address corresponding with a terminal apparatus included in the above described PoC group but includes information indicative of a number of terminal apparatus set to non notification setting. Since a user address on a notification subject user is transmitted while a user address itself on a non notification subject user is not transmitted, network resources in wireless section can be effectively utilized.

A terminal apparatus according to claim 6 of the present invention is a terminal apparatus of carrying out a PoC group session of realizing group talk with another terminal apparatus, comprising non notification command transmitting means for transmitting to another terminal apparatus a non notification command for employing non notification on a caller terminal's user address against the another terminal apparatus included in the above described PoC group. With such a configuration, user addresses of all members of a group or a part of a group can be hidden from all the group members (set to non notification).

A terminal apparatus according to claim 7 of the present invention is a terminal apparatus for carrying out a PoC group session of realizing group talk with another terminal apparatus, comprising display controlling means for displaying, in a caller's terminal, contents indicative of non notification on a user address in reception of non notification setting command for employing non notification on a user address corresponding with a terminal apparatus included in the above described PoC group. With such a configuration, user addresses of all members of a group or a part of a group can be hidden from all the group members (set to non notification).

The terminal apparatus according to claim 8 is provided, in claim 7, in which the above described non notification setting command includes a user address and an identifier of indicating whether or not the above described user address is set to non notification and the above described display controlling means display "non notification" corresponding with contents of the above described identifier. The terminal apparatus can be caused to display contents indicative of non notification on a user address by means of transmitting together with the user address an identifier indicating whether or not to set it to non notification.

The terminal apparatus according to claim 9 of the present invention is provided, in claim 7, in which the above described non notification setting command includes a user address and DISPLAYNAME information indicating contents to be displayed, instead of the above described user address, in a display window of respective PoC terminal apparatuses and the above described display controlling means display the contents of the above described DISPLAYNAME information. Transmission of the contents to be displayed to replace display of the user address will only have to display those contents in the terminal apparatus.

The terminal apparatus according to claim 10 of the present invention is provided, in claim 7, in which the non notification setting command does not include a user address corresponding with a terminal apparatus included in the PoC group but includes information indicative of a number of terminal apparatus set to non notification setting and the display controlling means display "non notification" corresponding with a number of the terminal apparatus. Since a user address on a notification subject user is transmitted while a user address itself on a non notification subject user is not transmitted, a waste of network resources can be prevented.

A PoC communication method according to claim 11 of the present invention is a PoC communication method of carrying out a PoC group session of realizing group talk with a terminal apparatus, comprising a non notification command obtaining step (for example, corresponding to Step S22 in FIG. 8) of obtaining non notification command for employing non notification on a user address corresponding with a terminal apparatus included in the above described PoC group and a non notification setting step (for example, corresponding to Step S27 in FIG. 8) of transmitting to another terminal apparatus a non notification setting command for setting non notification onto a user address related to the above described non notification command obtained by the above described non notification command obtaining step against the another terminal apparatus included in the PoC group. With such a configuration, user addresses of all members of a group or a part of a group can be hidden from all the group members (set to non notification).

The PoC communication method according to claim 12 of the present invention is provided, in claim 11, in which in the above described non notification command obtaining step, anyone of apparatuses among a plurality of apparatuses obtains the above described non notification command inclusive of the above described non notification setting information from another apparatus (for example, corresponding to Step S61 to Step S63 in FIG. 24) in the case where non notification setting information indicating whether or not respective user addresses of terminal apparatuses included in the above described PoC group are set to non notification is managed over a plurality of apparatuses thereof. In the case where non notification setting information is managed over a plurality of PoC communication service controlling apparatuses, one of those apparatuses obtains non notification setting information from another apparatus and transmits it to a terminal apparatus, and then non notification processing can be realized also in case of realizing group talk among terminal apparatuses from different communication service providers.

The PoC communication method according to claim 13 of the present invention is provided, in claim 11, in which the above described non notification setting command is transmitted, prior to commencement of the above described PoC group session, from a terminal apparatus desired to be set to non notification. With such a configuration, prior to commencement of the PoC group session, a terminal apparatus to become a called party can set itself to non notification.

The PoC communication method according to claim 14 of the present invention is provided, in claim 11, in which the above described non notification setting command is transmitted from a terminal apparatus at a caller side at the time of commencement of the above described PoC group session. With such a configuration, any user address within a group can be set to non notification at the time of commencement of the PoC group session.

The PoC communication method according to claim 15 of the present invention is provided, in claim 11, in which the above described non notification setting command is transmitted from a terminal apparatus during transmission by means of the above described PoC group session. With such a configuration, a user address that has been notified at the time of commencement of the PoC group session can be changed to non notification setting thereafter.

The PoC communication method according to claim 13 of the present invention is provided, in claim 11, in which the above described non notification setting command includes a user address and an identifier of indicating whether or not the above described user address is set to non notification. The terminal apparatus can be caused to display contents indicative of non notification on a user address by means of transmitting together with the user address an identifier indicating whether or not to set it to non notification.

The PoC communication method according to claim 14 of the present invention is provided, in claim 11, in which the above described non notification setting command includes a user address and DISPLAYNAME information indicating contents to be displayed, instead of the above described user address, in display windows of respective PoC terminal apparatuses. Not displaying the user address but by transmitting the contents to be displayed instead, the terminal apparatus will only have to display those contents.

The PoC communication method according to claim 15 of the present invention is provided, in claim 11, in which the above described non notification setting command does not include a user address corresponding with a terminal apparatus included in the above described PoC group but includes information indicative of a number of terminal apparatus set to non notification setting. Since a user address on a notification subject user is transmitted while a user address itself on a non notification subject user is not transmitted, a waste of network resources can be prevented.

In short, in the present invention, in PoC communication services, when a PoC subscriber starts PoC group communication, non notification subjects are selected and then a PoC session commencement request is sent out. At that time, a caller is made capable of setting address of himself/herself and/or all or a part of users (telephone number, SIP, URI and the like) to non notification.

On a user designated as a non notification subject due to the caller's setting, PoC terminal apparatuses (mobile devices) in receipt of a PoC session commencement request or PoC communication service controlling apparatuses (PoC servers) carry out non notification setting processing.

At that time, on a called party not selected as a non notification subject user, if he/she sets his/her own user address to non notification prior to receipt of a PoC session commencement request, the PoC terminal apparatuses or the PoC communication service controlling apparatuses carry out non notification processing. Even after a PoC session is established, each user can set his/her own user address to non notification and non notification service complying with user's intention is providable.

As described above, the present invention gives rise to an effect that by obtaining non notification command for setting a user address corresponding with a terminal apparatus included in a PoC group to non notification and transmitting to the other terminal apparatuses a non notification setting command for setting the user address related to this obtained non notification command to non notification against the other terminal apparatuses included in the PoC group, a user's address can be hidden (set to non notification) from another user subject to user's setting.

BRIEF DESCRIPTION OF THE DRAWINGS

FIG. 10 is a table showing conditions where a user address undergoes non notification setting;

FIG. 11 is a flow sequence showing an example in the case where a PoC terminal apparatus has carried out non notification processing on user addresses;

FIG. 12 is a flow sequence showing an example in the case where a terminal has set its own user address to non notification setting after establishment of a PoC session;

DETAILED DESCRIPTION OF THE PREFERRED EMBODIMENTS

Figure 1A:
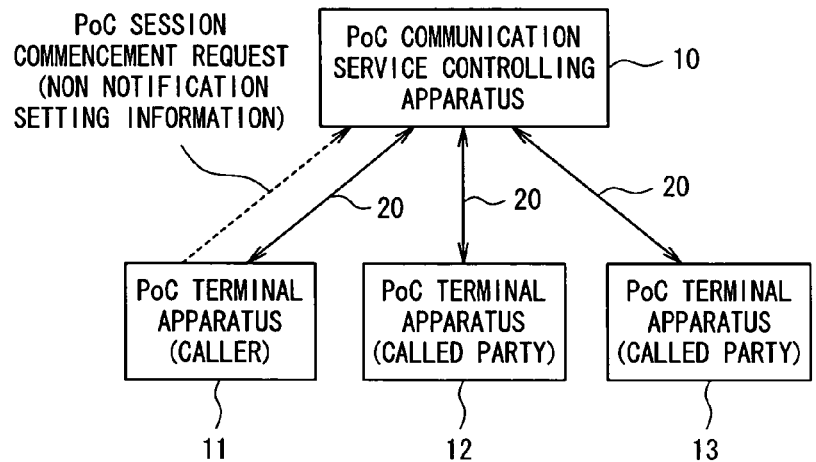
FIG. 1A and FIG. 1B are conceptual diagrams in the case where a PoC terminal apparatus has carried out non notification processing.

An embodiment of the present invention will be described below with reference to drawings. In each drawing to be referred to in description below, like reference characters in different drawings designate the same or similar parts. (Configuration example of PoC communication system) FIG. 1A and FIG. 2A are block diagrams showing configuration examples of PoC communication system in adoption of a PoC communication server apparatus and a terminal apparatus according to the present embodiment.

Figure 2A:
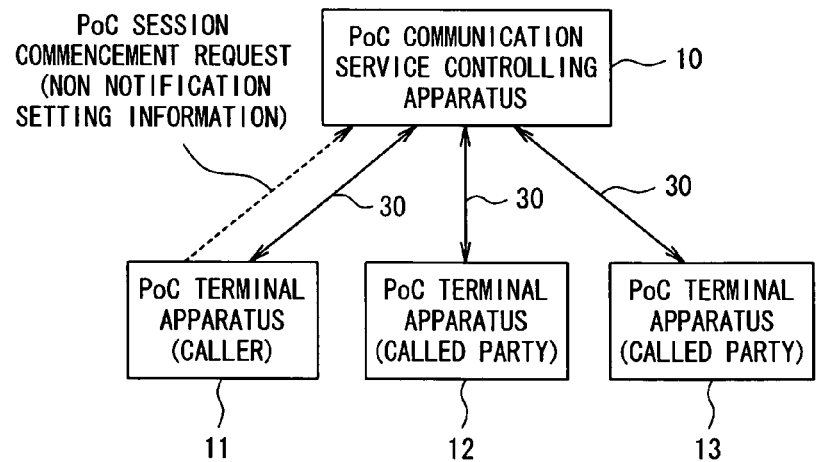
FIG. 2A and FIG. 2B are conceptual diagrams in the case where a PoC communication service controlling apparatus has carried out non notification processing.

FIG. 1A is a block diagram showing a configuration in case of implementing non notification processing in respective PoC terminal apparatuses. In the drawing, a PoC terminal apparatus 11 is a terminal apparatus used by a caller who transmits a PoC session commencement request (non notification setting information) and has functions as a mobile terminal inclusive of a CPU, a storage portion, a communication portion, a display portion, an audio input/output portion and the like not shown in the drawing. A PoC communication service controlling apparatus 10 is an apparatus of implementing processing to realize PoC communication and has functions as a PoC communication server apparatus inclusive of a CPU, a storage portion, a communication portion and the like not shown in the drawing. PoC terminal apparatuses 12 and 13 are terminal apparatus that called parties use and implements PoC group sessions together with the PoC terminal apparatus 11.

Figure 3:
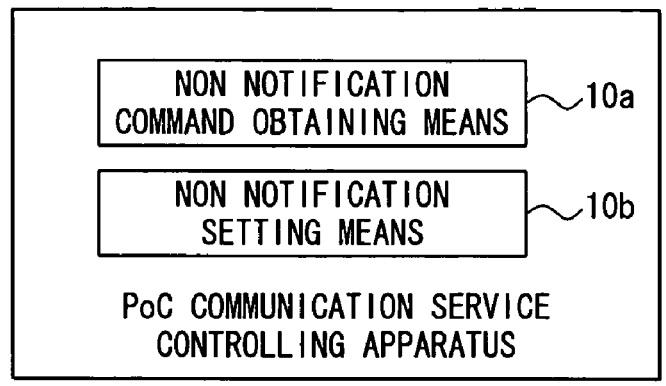
FIG. 3 is a diagram showing an example of a functional configuration of a PoC communication service controlling apparatus.

Functional configuration of the PoC communication service controlling apparatus 10 is shown in FIG. 3. As shown in the above described drawing, the PoC communication service controlling apparatus has non notification command obtaining means 10a for obtaining non notification command for employing non notification on a user address corresponding with a terminal apparatus included in a PoC group and non notification setting means 10*b* for transmitting to the other terminal apparatuses a non notification setting command for setting non notification onto a user address related to the non notification command obtained by this non notification command obtaining means 10*a* against the other terminal apparatuses included in the PoC group.

Figure 4:
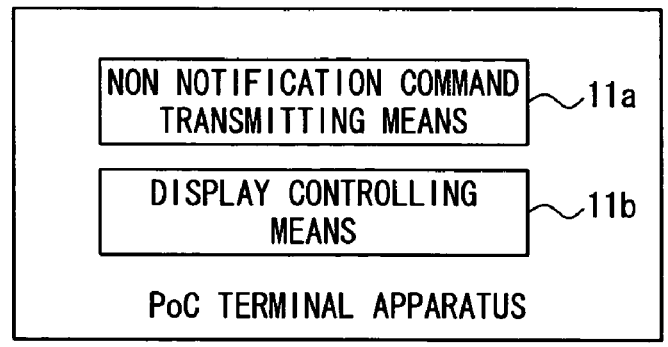
FIG. 4 is a diagram showing an example of a functional configuration of a PoC terminal apparatus.

A functional configuration of the PoC terminal apparatuses 11 to 13 is shown in FIG. 4. As shown in the above described drawing, the PoC terminal apparatus has non notification command transmitting means 11*a* for transmitting a non notification command of setting non notification on its own user address against the other terminal apparatuses included in the PoC group and display controlling means 11*b* for displaying, in itself, contents indicative of non notification on a user address in case of receiving a non notification setting command so as to set non notification to the user address corresponding with a terminal apparatus included in the PoC group.

Figure 1B:
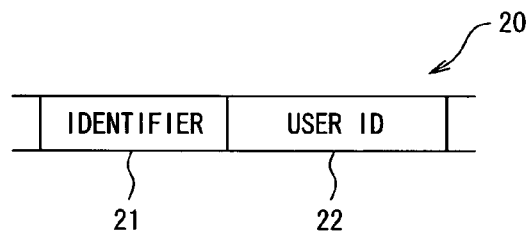

A configuration example of a packet 20 transmitted from the PoC communication service controlling apparatus 10 to respective PoC terminal apparatuses 11 to 13 is shown in FIG. 1B. With reference to FIG. 1B, the packet 20 is configured by including an identifier 21 indicating whether or not to notify the user address and a user ID 22 to become an actual user address. The present example implements only setting of identifier value in the PoC communication service controlling apparatus 10 and implements non notification processing corresponding with contents of the identifier in respective PoC terminal apparatuses 11 to 13. That is, if an identifier is set to a value indicative of non notification, message indicative of non notification will be displayed in display windows in respective PoC terminal apparatuses 11 to 13. In contrast, if no identifier is set to a value indicative of non notification, message indicative of non notification will not be displayed in display windows in respective PoC terminal apparatuses 11 to 13. Hereinafter, the case of processing according to FIG. 1A and FIG. 1B will be referred to as "Case 1".

On the other hand, FIG. 2A is a block diagram showing a configuration in case of implementing non notification processing in the PoC communication service controlling apparatus. In the above described drawing, the PoC terminal apparatus 11 is a terminal apparatus used by a caller who transmits a PoC session commencement request (non notification setting information). The PoC communication service controlling apparatus 10 is an apparatus of implementing processing of realizing PoC communication. The PoC terminal apparatuses 12 and 13 are terminal apparatuses used by called parties and implement PoC group sessions together with the PoC terminal apparatus 11.

Figure 2B:
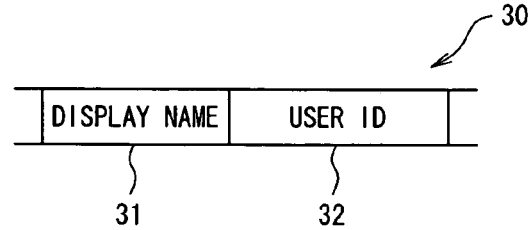

A configuration example of a packet 30 transmitted from the PoC communication service controlling apparatus 10 to respective PoC terminal apparatuses 11 to 13 is shown in FIG. 2B. With reference to FIG. 2B, the packet 30 is configured by including DISPLAYNAME 31 indicating contents to be displayed in display windows of respective PoC terminal apparatuses and a user ID 22 to become an actual user address. In the present example, contents to be displayed in display windows of respective terminal apparatuses in the PoC communication service controlling apparatus 10 is written in the DISPLAYNAME 31 and respective PoC terminal apparatuses 11 to 13 display them as are. That is, in the case where the PoC communication service controlling apparatus 10 implements non notification processing, message indicative of non notification will be written in the region of DISPLAYNAME 31. In contrast, in the case where the PoC communication service controlling apparatus 10 implements no non notification processing, the user name and the like are written in the region of DISPLAYNAME 31 and respective PoC terminal apparatuses 11 to 13 display it as is. Hereinafter, the case of processing according to FIG. 2A and FIG. 2B will be referred to as "Case 2".

As described above, user address non notification processing will be implemented by either the PoC terminal apparatus or the PoC communication service controlling apparatus.

(Non Notification Setting Operation Example)

An example of non notification setting operation of a PoC terminal apparatus will be described with reference to FIG. 5 to FIG. 9.

Figure 5:
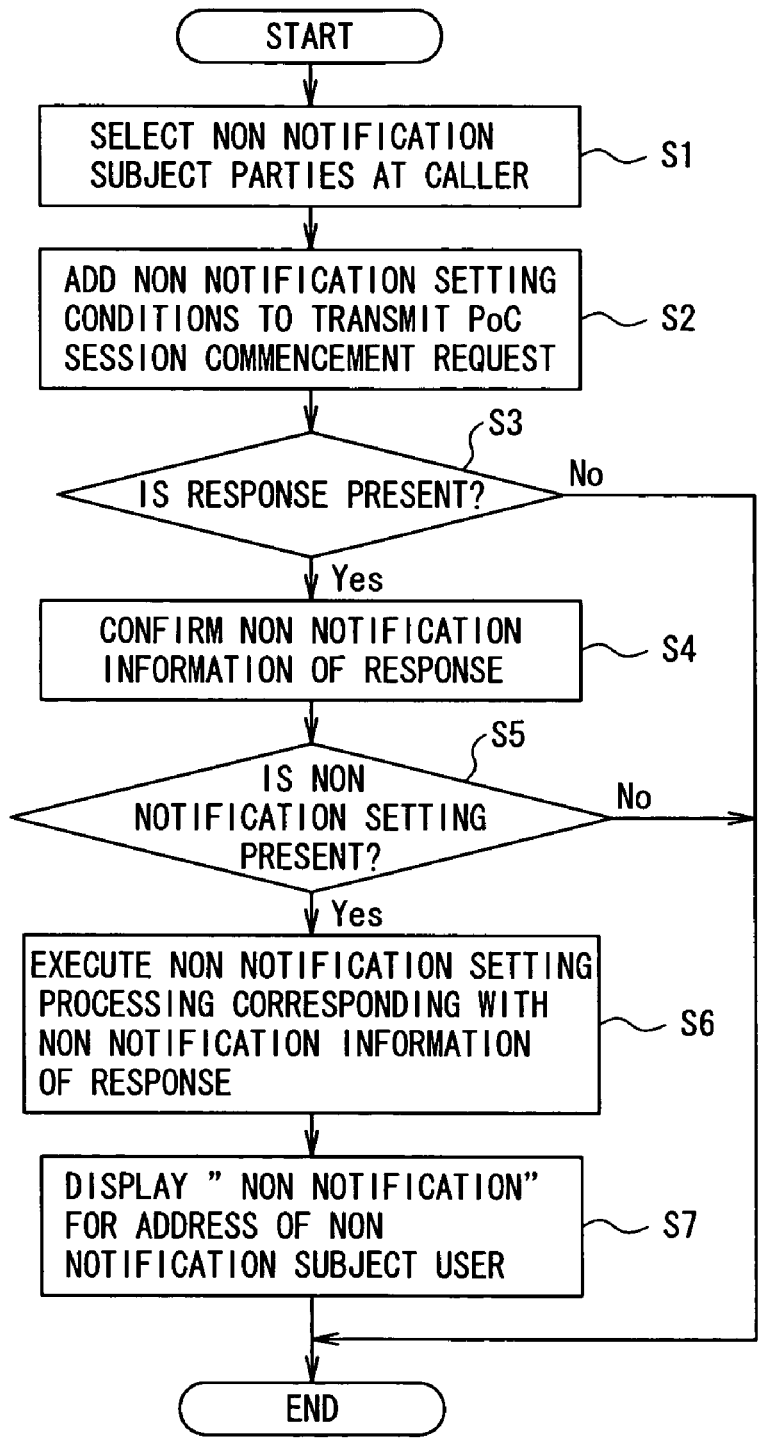
FIG. 5 is a flow chart showing an operation example of a caller's PoC terminal apparatus.

FIG. 5 is a flow chart showing an operation example of a terminal apparatus of a PoC session caller. In FIG. 5, at first, a PoC session caller operates a terminal apparatus to select non notification subject parties (Step S1). Adding non notification setting information, it transmits a PoC session commencement request (Step S2).

Thereafter, when there is a response from the PoC communication service controlling apparatus, contents of the non notification information included in that response are confirmed (from Step S3 to Step S4). As a result of this confirmation, if non notification is set, non notification setting processing corresponding with the non notification information is executed (from Step S5 to Step S6). This sets the address of non notification subject user to "non notification" (Step S7).

In case of no response in Step S3 and in the case where non notification is not set in Step S5, processing will directly come to an end.

Figure 6:
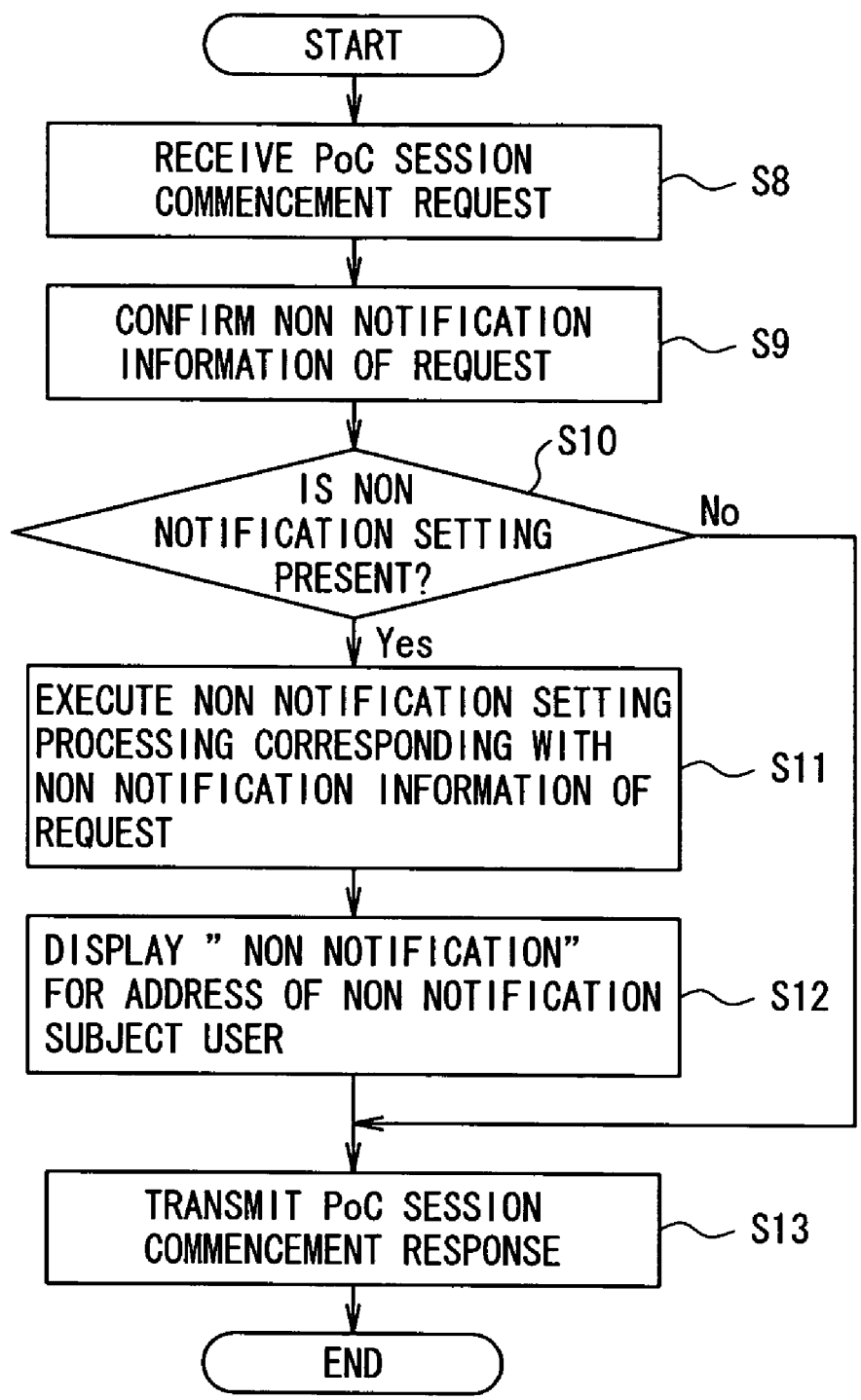
FIG. 6 is a flow chart showing an operation example of a called party's PoC terminal apparatus.

FIG. 6 is a flow chart showing an operation example of a PoC session called party's PoC terminal apparatus. In FIG. 6, upon receipt of a PoC session commencement request from a PoC session caller's terminal apparatus (Step S8), contents of non notification information included in that request are confirmed (Step S9). As a result of this confirmation, if non notification is set, non notification setting processing corresponding with that non notification information is executed (from Step S10 to Step 11). This sets the address of non notification subject user to "non notification" (Step S12).

In Step S12, in case of Case 1, a command of requesting non notification is notified and message of "non notification" is outputted in the display window in a terminal apparatus so that an address of a subject user is displayed as non notification. On the other hand, in case of Case 2, the address of the subject user has already undergone processing for non notification display by means of the PoC communication service controlling apparatus. Therefore, the terminal apparatus simply reads the non notification information in receipt and displays it directly in the display window of the terminal apparatus. Consequently, "non notification" will be outputted in display.

When non notification display is completed in the called party's terminal apparatus, a PoC session commencement response is transmitted to the PoC communication service controlling apparatus (Step S13).

As a result of confirmation in Step S9, if non notification is not set, the PoC session commencement response is transmitted directly. (Step S10 to Step S13).

Figure 7:
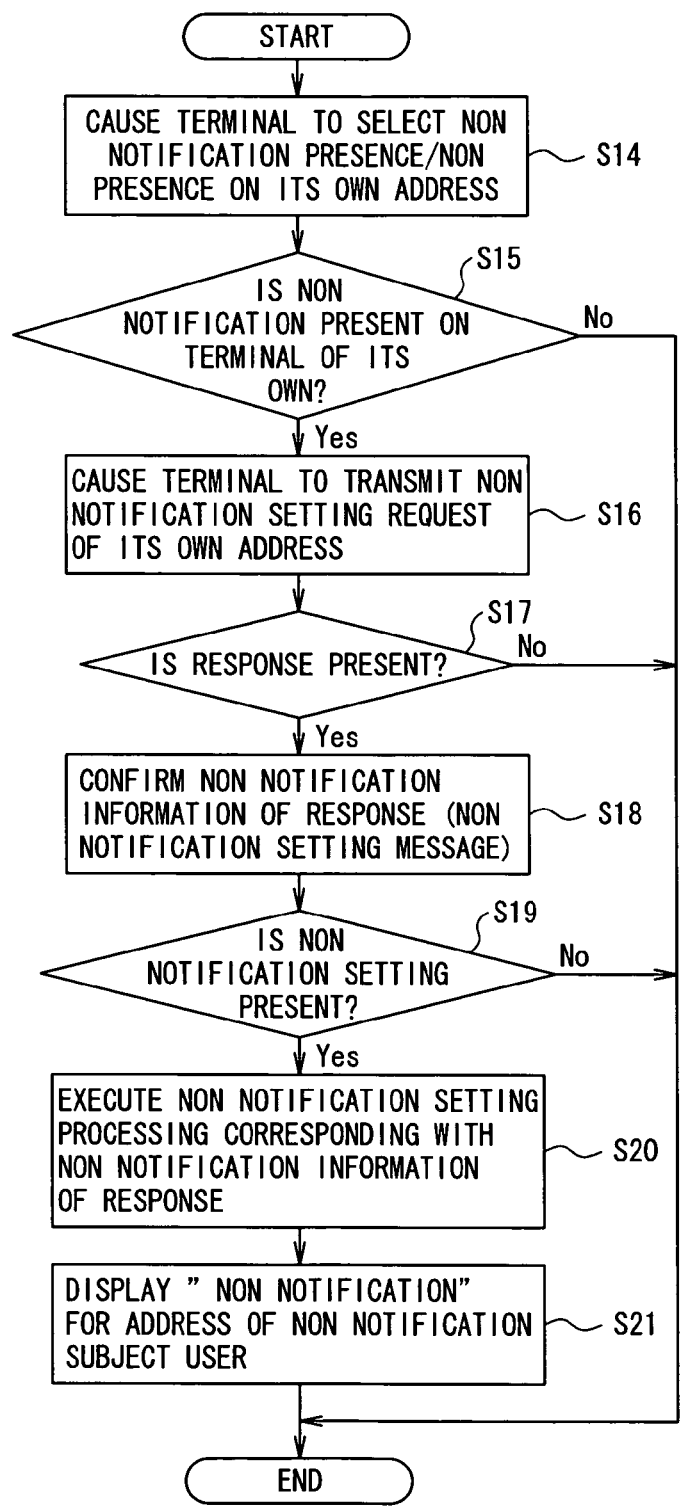
FIG. 7 is a flow chart showing an operation example in the case where a terminal has sent a non notification setting request on a its own address.

FIG. 7 is a flow chart showing an operation example in the case where a terminal has sent a non notification setting request on its own address. In FIG. 7, at first an address of a terminal hereof undergoes operation of selecting employment of non notification (Step S14). In case of setting the address of such terminal to non notification, a non notification setting request on such terminal's address is transmitted (Step S15 to Step S16).

Thereafter, when there is a response from the PoC communication service controlling apparatus, contents of the non notification information included in that response, that is, non notification setting message are confirmed (from Step S17 to Step S18). As a result of this confirmation, if non notification is set, non notification setting processing corresponding with the non notification information is executed (from Step S19 to Step S20). This sets the address of non notification subject user to "non notification" (Step S21).

In case of setting no non notification on the address of such terminal in Step S15, in case of no response in Step S17 and in the case where non notification is not set in Step S19, processing will directly come to an end.

Figure 8:
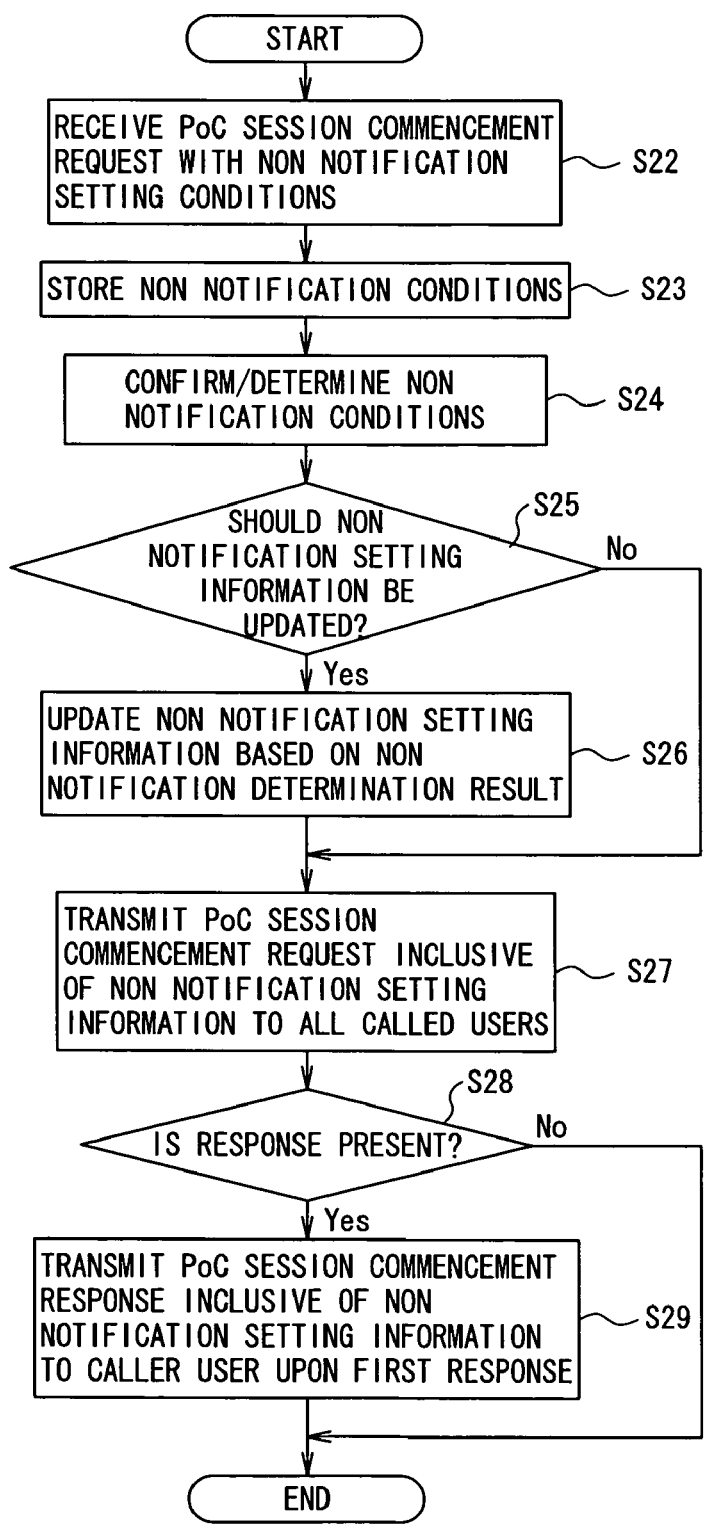
FIG. 8 is a flow chart showing a non notification setting operation example at the time of transmitting/receiving a PoC session commencement request/response.

FIG. 8 is a flow chart showing a non notification setting operation example at the time of transmitting/receiving a PoC session commencement request/response. In FIG. 8, upon receipt of a PoC session commencement request with non notification setting conditions (Step S22), the non notification conditions included in that request are stored (Step S23). Thereafter, the non notification conditions undergo confirmation and determination (Step S24).

And in the case where the non notification setting information needs to undergo updating, after the non notification setting information undergoes updating based on the non notification determination result (from Step S25 to Step S26), a PoC session commencement request inclusive of non notification setting information is transmitted to all the called users (Step S27). On the other hand, in the case non notification setting information does not need to undergo updating, without any updating, the PoC session commencement request inclusive of non notification setting information is transmitted to all the called users (Step S25 to Step S27).

With successful receipt of at least one PoC session commencement response, the PoC communication service controlling apparatus adds, to the PoC session commencement response, non notification setting information similar to that transmitted to the called party and transmits it to the caller's terminal apparatus (Step S28 to Step S29). In case of no response from the called user, processing will directly come to an end.

Figure 9:
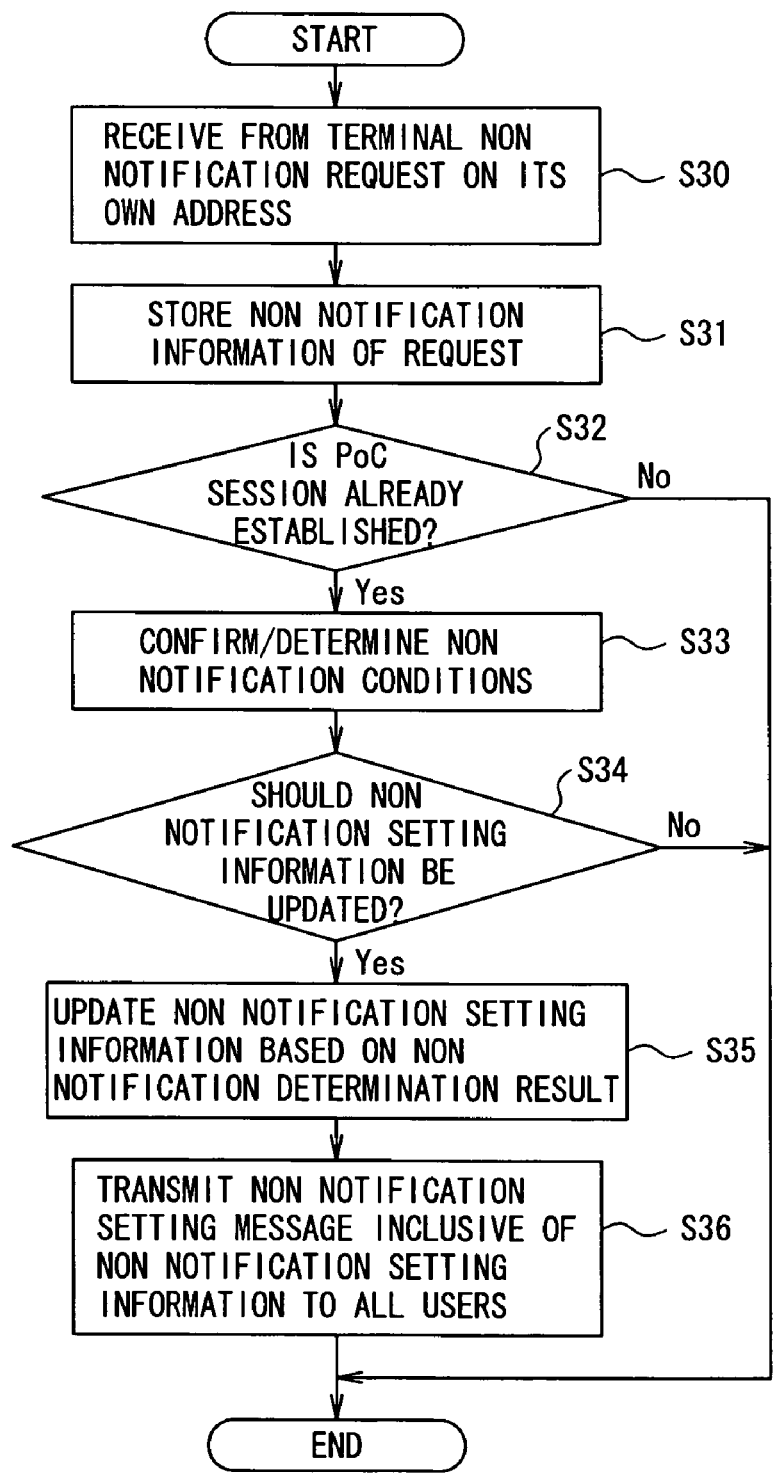
FIG. 9 is a flow chart showing a non notification setting operation example at the time when a terminal transmits non notification setting request/response (non notification setting message) on its own address.

FIG. 9 is a flow chart showing a non notification setting operation example at the time when a terminal transmits non notification setting request/response (non notification setting message) on its own address. In FIG. 9, upon receipt of a non notification request on such terminal's address (Step S30), the non notification information included in that request is stored (Step S31).

In the case where a PoC session is already established, the non notification conditions undergo confirmation and determination (from Step S32 to Step S33). And in the case where the non notification setting information needs to undergo updating, after the non notification setting information undergoes updating based on the non notification determination result (from Step S34 to Step S35), non notification setting message inclusive of non notification setting information is transmitted to all the called users (Step S36).

In the case where no PoC session is established in Step S32 and in the case where non notification setting information does not need to be updated in Step S34, processing will directly come to an end.

(Conditions Employed for Non Notification Setting)

FIG. 10 is a table showing conditions where a user address undergoes non notification setting. In FIG. 10, presence of non notification of a user address is indicated by ◯/x. "◯" indicates setting to non notification against all the users while "x" indicates that non notification processing is not carried out.

At the time of a PoC session commencement request (INVITE), there is a case with presence of non notification setting by the caller (non notification subject is selected at the time of calling) and a case with absence of non notification setting (non notification subject is not selected at the time of calling).

With regard to non notification setting on the called party's own terminal address by the called party, there is a case with presence of non notification setting (the called party's non notification setting request on the user's own terminal address is transmitted) and a case with absence of non notification setting (the called party's non notification setting request on the user's own terminal address is not transmitted).

As shown in FIG. 10, if non notification is set by at least one of the caller party and the called party, such user address will be set to non notification. And until the caller party gets out of the session, the non notification setting shown in FIG. 10 is maintained.

(Case 1)

FIG. 11 as well as FIG. 12 is a flow sequence showing an example in the case where a PoC terminal apparatus has carried out non notification processing.

FIG. 11 is a flow showing a user B requests for non notification on his/her own terminal address before a request for a PoC session is transmitted until the PoC session is established. In FIG. 11, when the user B being the called party of a PoC terminal apparatus 12 requests for non notification setting on his/her own terminal address (Step S101), a PoC communication service controlling apparatus 10 stores that the address of the user B has been set to non notification (Step S102). As described above, a non notification setting request of such a terminal address can be sent out at any timing regardless of the state of PoC session establishment. However, until a PoC session is established, non notification setting on such terminal address is not made effective.

On the other hand, a PoC terminal apparatus 11 selects user addresses on a user A and the user B as non notification subject (Step S103) and transmits a PoC session commencement request (INVITE) (Step S104). This PoC session commencement request (INVITE) is transmitted to the PoC communication service controlling apparatus 10 (Step S105).

The PoC communication service controlling apparatus 10 stores non notification information in receipt with the PoC session commencement request and implements non notification setting determination (Step S106). Thereafter, the PoC communication service controlling apparatus 10 transmits a PoC session commencement request (INVITE) to PoC terminal apparatuses 12 and 13 (Step S107, Step S109). The PoC terminal apparatuses 12 and 13 in receipt of this PoC session commencement request (INVITE) undergo non notification processing (Step S108, Step S110) so that the user addresses on the user A and the user B will be set to non notification.

Thereafter, when the PoC terminal apparatus 12 transmits a PoC session commencement response to the PoC communication service controlling apparatus 10 (Step S111), the PoC communication service controlling apparatus 10 transmits a PoC session commencement response to a PoC terminal apparatus 11 (Step S112). Thereby the PoC terminal apparatus 11 undergoes non notification processing (Step S113). In the case where a PoC terminal apparatus 13 transmits a PoC session commencement response (Step S114), the PoC terminal apparatus 13 does not undergo non notification processing since its user address is not set to non notification.

Thereafter the PoC terminal apparatuses 11 to 13 will enter PoC communication state (Step S115).

FIG. 12 is a flow in the case where a user C requests for setting his/her own terminal's address to non notification during PoC communication after a PoC session has been established. In FIG. 12, during a PoC communication by PoC terminal apparatuses 11 to 13 (Step S115), the PoC terminal apparatus 13 transmits a request for setting its own terminal's user address to non notification (Step S116), then a PoC communication service controlling apparatus 10 stores that the address of the user C has been set to non notification (Step S117) and implements non notification setting determination (Step S118).

Thereafter, the PoC communication service controlling apparatus 10 transmits, to PoC terminal apparatuses 11 to 13, non notification setting message for giving instructions to set the address of the user C to non notification (Step S119, Step S121 and Step S123). The PoC terminal apparatuses 11 and 12 in receipt of this message undergo non notification processing on the user address of the user C (Step S120, Step S122 and Step S124).

(Case 2)

Figure 13:
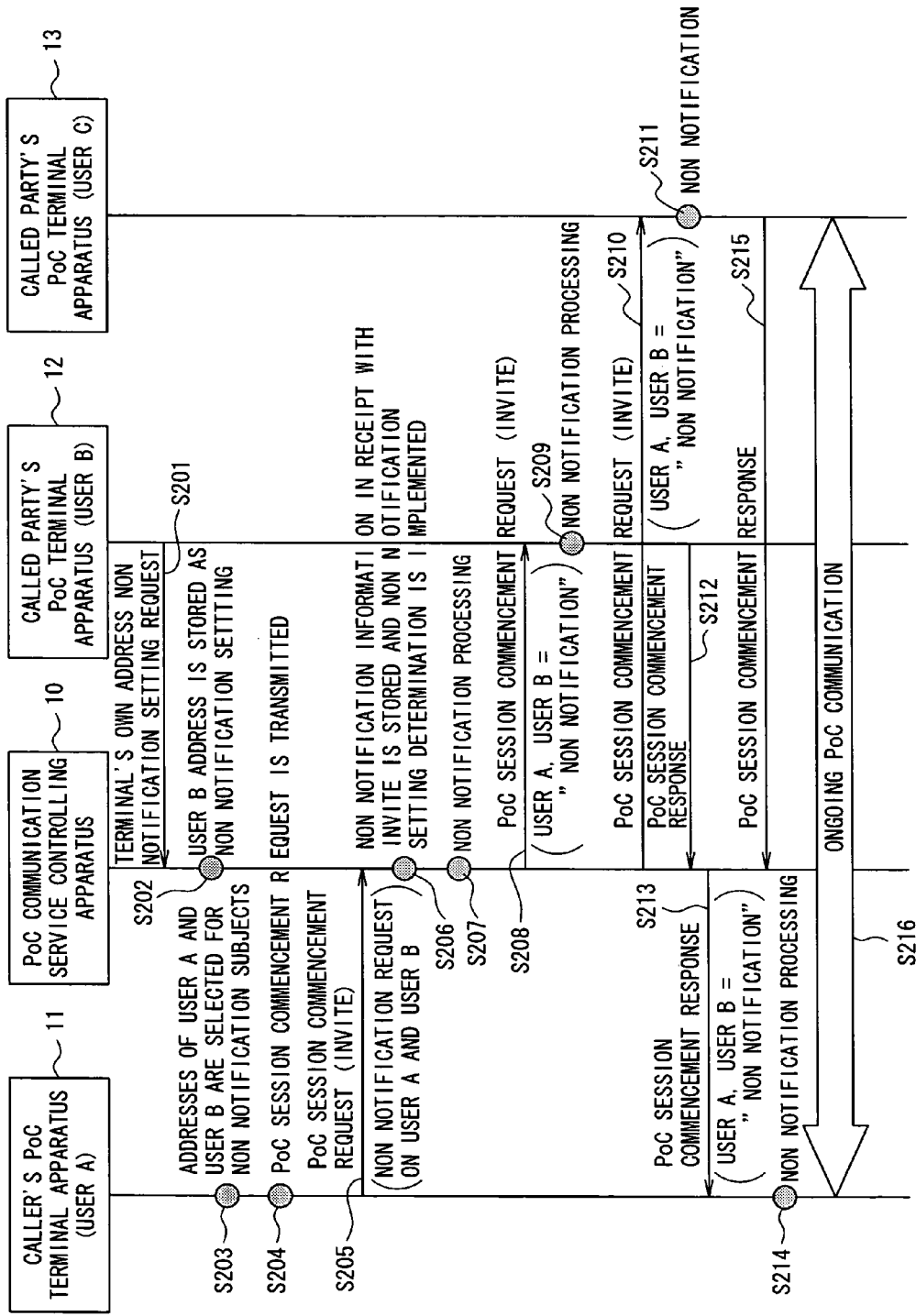
FIG. 13 is a flow sequence showing an example in the case where a PoC communication service controlling apparatus has carried out user address non notification processing.
Figure 14:
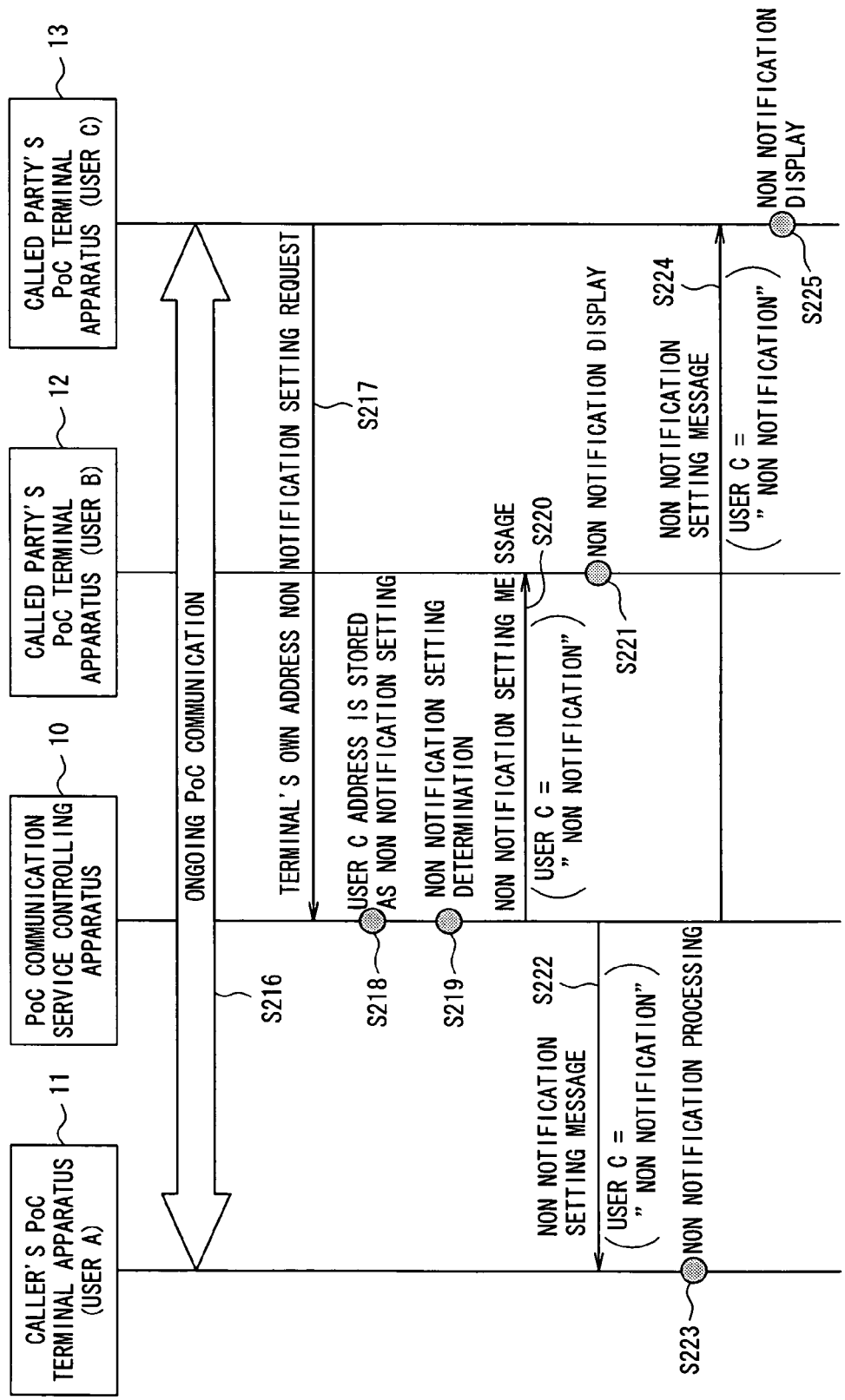
FIG. 14 is a flow sequence showing an example in the case where a terminal has set its own user address to non notification setting after establishment of a PoC session.

FIG. 13 as well as FIG. 14 is a flow sequence showing an example in the case where a PoC communication service controlling apparatus has carried out non notification processing.

FIG. 13 is a flow showing a user B requests for non notification on his/her terminal address before a request for a PoC session is transmitted until the PoC session is established. In FIG. 13, when the user B being the called party of a PoC terminal apparatus 12 requests for non notification setting on his/her own terminal address (Step S201), a PoC communication service controlling apparatus 10 stores that the address of the user B has been set to non notification (Step S202). As described above, a terminal's own address non notification setting request can be sent out at any timing regardless of the state of PoC session establishment. However, until a PoC session is established, non notification setting on a terminal's own address is not made effective.

On the other hand, a PoC terminal apparatus 11 selects user addresses on a user A and the user B as non notification subject (Step S203) and transmits a PoC session commencement request (INVITE) (Step S204). This PoC session commencement request (INVITE) is transmitted to the PoC communication service controlling apparatus 10 (Step S205).

The PoC communication service controlling apparatus 10 stores non notification information in receipt with the PoC session commencement request and implements non notification setting determination (Step S206). Thereafter, the PoC communication service controlling apparatus 10 implements non notification processing (Step S207). Moreover, the PoC communication service controlling apparatus 10 transmits a PoC session commencement request (INVITE) to PoC terminal apparatuses 12 and 13 (Step S208, Step S210). The PoC terminal apparatuses 12 and 13 in receipt of this PoC session commencement request (INVITE) undergo non notification processing (Step S209, Step S211) so that the user addresses on the user A and the user B will be set to non notification.

Thereafter, when the PoC terminal apparatus 12 transmits a PoC session commencement response to the PoC communication service controlling apparatus 10 (Step S212), the PoC communication service controlling apparatus 10 transmits a PoC session commencement response to a PoC terminal apparatus 11 (Step S213). Thereby the PoC terminal apparatus 11 undergoes non notification processing (Step S214). In the case where a PoC terminal apparatus 13 transmits a PoC session commencement response (Step S215), the PoC terminal apparatus 13 does not undergo non notification processing since its user address is not set to non notification. Thereafter the PoC terminal apparatuses 11 to 13 will enter PoC communication state (Step S216).

FIG. 14 is a flow in the case where a user C requests for setting his/her own terminal's address to non notification during PoC communication after a PoC session has been established. In FIG. 14, during a PoC communication by PoC terminal apparatuses 11 to 13 (Step S216), the PoC terminal apparatus 13 transmits a request for setting its own terminal's user address to non notification (Step S217), then a PoC communication service controlling apparatus 10 stores that the address of the user C has been set to non notification (Step S218) and implements non notification setting determination (Step S219).

Thereafter, the PoC communication service controlling apparatus 10 transmits, to PoC terminal apparatuses 11 to 13, non notification setting message for giving instructions to set the address of the user C to non notification (Step S220, Step S222 and Step S224). The PoC terminal apparatuses 11 and 12 in receipt of this message undergo non notification processing on the user address of the user C (Step S221, Step S223 and Step S225).

(Particular Operation Example)

A particular operation example in the case where a PoC terminal apparatus has carried out non notification processing will be described with reference to FIG. 15A to FIG. 15D. Full lines in FIG. 15A to FIG. 15D indicate PoC communication traffic.

Figure 15A:
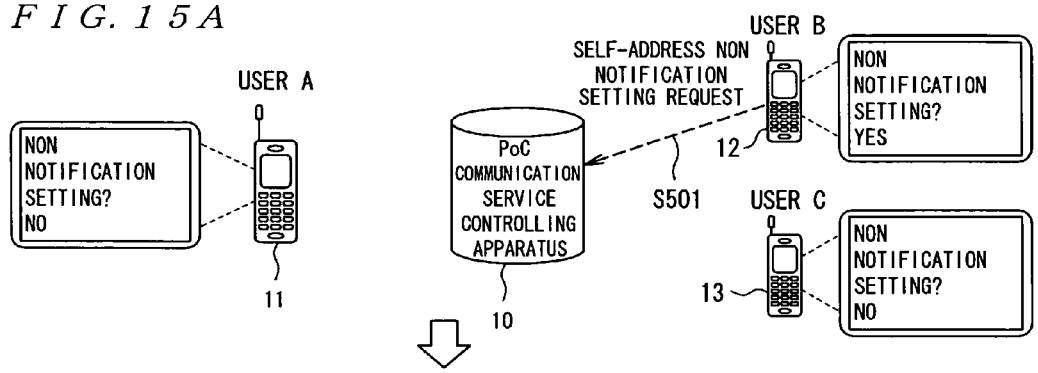
FIG. 15A to FIG. 15D are drawings showing an example of operations in the case where a PoC terminal apparatus has carried out user address non notification processing.

In FIG. 15A, prior to establishment of the PoC session, a user B sets his/her user address (SIP URI) to non notification, then self-address non notification setting request is sent to a PoC communication service controlling apparatus 10 (Step S501). Then, the PoC communication service controlling apparatus 10 stores that the user B has employed non notification setting.

Figure 15B:
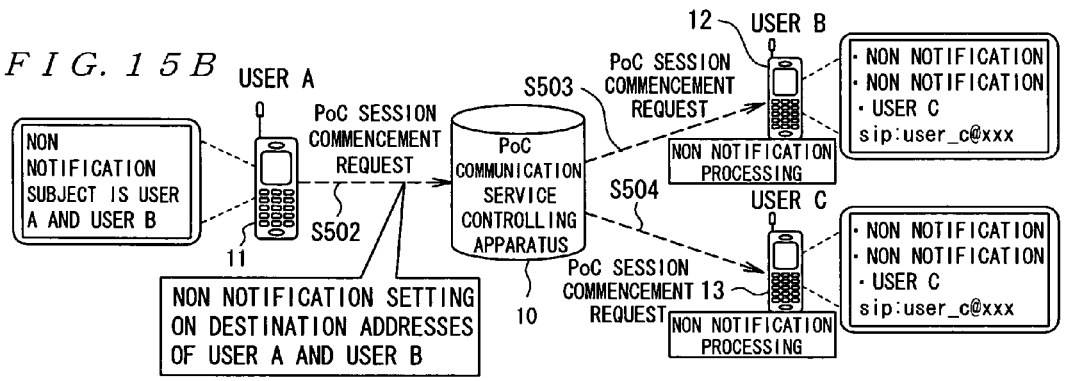

Next, in FIG. 15B, a terminal apparatus 11 of a user A who desires to start PoC group communication among users A, B and C sends a PoC session commencement request (for example, SIP INVITE). At that time, suppose that the user A desires not to disclose the user addresses of the user A and the user B. The PoC session commencement request includes information of setting the user addresses of the user A and the user B to non notification. This information is stored in the PoC communication service controlling apparatus 10.

The PoC communication service controlling apparatus 10 undergoes non notification processing in accordance with contents in FIG. 10. That is, collating the self-terminal address non notification setting request and non notification setting information included in the PoC session commencement request, if at least one of requests is set to non notification, instruction to set to non notification is sent to PoC terminal apparatuses 12 and 13 other than the caller (Step S503, Step S504). This instruction includes information of setting the user address of the user A and the user B to non notification. Upon receipt of the request, non notification processing is simultaneously executed in the PoC terminal apparatuses 12 and 13 of the user B and the user C. As described above, PoC communication during and after establishment of a PoC session, respective PoC terminal apparatuses 11, 12 and 13 display in their windows "non notification" on the user A, "non notification" on the user B and the display name as well as the user address on the user C.

Figure 15C:
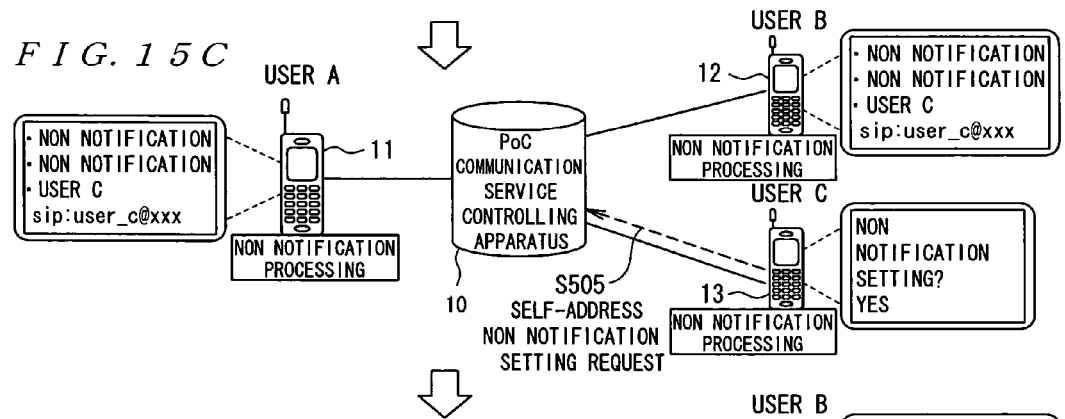

In FIG. 15C, in the case where the user C also desires to give up disclosing his/her user address due to a certain reason at the time when the PoC session is already established, that is, during PoC communication, the user C sends a request for setting his/her own user address to non notification to the PoC communication service controlling apparatus 10 (Step S505). The PoC communication service controlling apparatus 10 in receipt of this request transmits, respectively to PoC terminal apparatuses 11, 12 and 13, instruction of setting the user address of the user C to non notification. Subject to receipt of this instruction, the respective PoC terminal apparatuses 11, 12 and 13 carry out user address non notification processing on the user C.

Figure 15D:
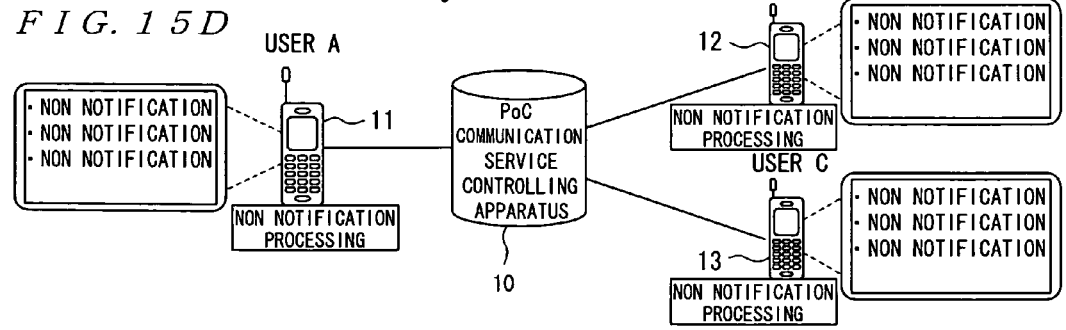

Subsequently, as shown in FIG. 15D, PoC communication is kept going on in the state with the user address set to non notification in all the PoC terminal apparatuses 11, 12 and 13.

(Transmission of Number of Non Notification Subject Users)

Figure 16A:
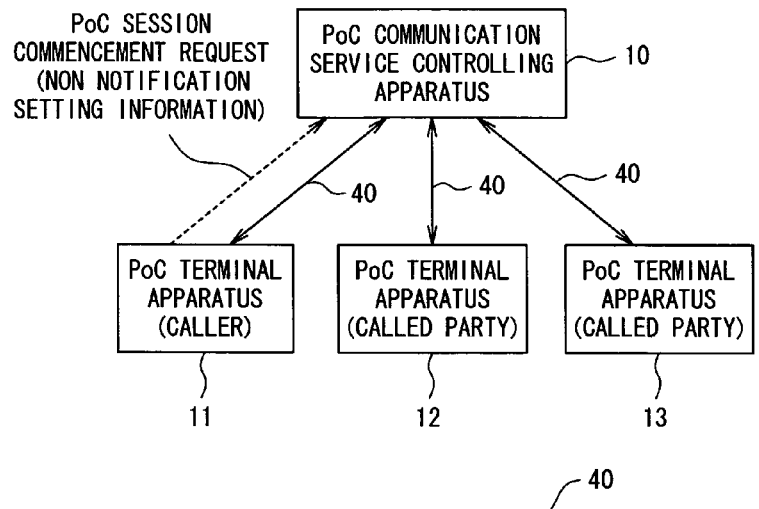
FIG. 16A and FIG. 16B are conceptual drawings in case of having carried out non notification processing by means of transmitting the number of non notification subject users.

Here, in any case of the above described Case 1 and Case 2, user addresses are always transmitted to PoC terminal apparatuses. However, from the point of view of utilizing network resources in wireless section effectively, it is inefficient to always transmit user addresses. Therefore, with regard to non notification subject users, such a method that user addresses themselves are not transmitted can be considered. In that case, as shown in FIG. 16A, in a PoC communication service controlling apparatus 10, only information on the number of non notification subject user (for example, a value of the number of non notification subject user) is included in a packet 40 and is transmitted so that respective PoC terminal apparatuses 11 to 13 display only the number of non notification subject users as "non notification".

Figure 16B:

There shown in FIG. 16B is a configuration example of the packet 40 transmitted from the PoC communication service controlling apparatus 10 to respective PoC terminal apparatuses 11 to 13. With reference to FIG. 16B, the packet 40 includes the number of non notification subject users.

For example, if the number of non notification subject users included in the packet 40 is "2", the respective PoC terminal apparatuses 11 to 13 will display in the display windows the message indicative of non notification for two people. In contrast, if the user address on a PoC terminal apparatus has been transmitted as is, the respective PoC terminal apparatuses 11 to 13 will determine that it is not a non notification subject user and the user address will not be displayed in the display windows (message indicative of non notification is not displayed). This processing will be referred to as "Case 3".

(Plurality of PoC Communication Service Controlling Apparatus)

Here, PoC communication service controlling apparatus may be present in plurality and a plurality of PoC communication service controlling apparatus thereof may realize PoC communication service. In that case, one PoC communication service controlling apparatus will become a base and the PoC communication service controlling apparatus to become the base collects non notification information and transmits INVITE. Here, consider a case where a caller and a called party are subscribers of mutually different communication service providers. In that case, the respective PoC terminal apparatuses of the caller and the called party can communicate with a PoC communication service controlling apparatus of a subscribed communication service provider and can communicate with the PoC communication service controlling apparatus of a not subscribed communication service provider via the PoC communication service controlling apparatus of the subscribed communication service provider.

Figure 17:
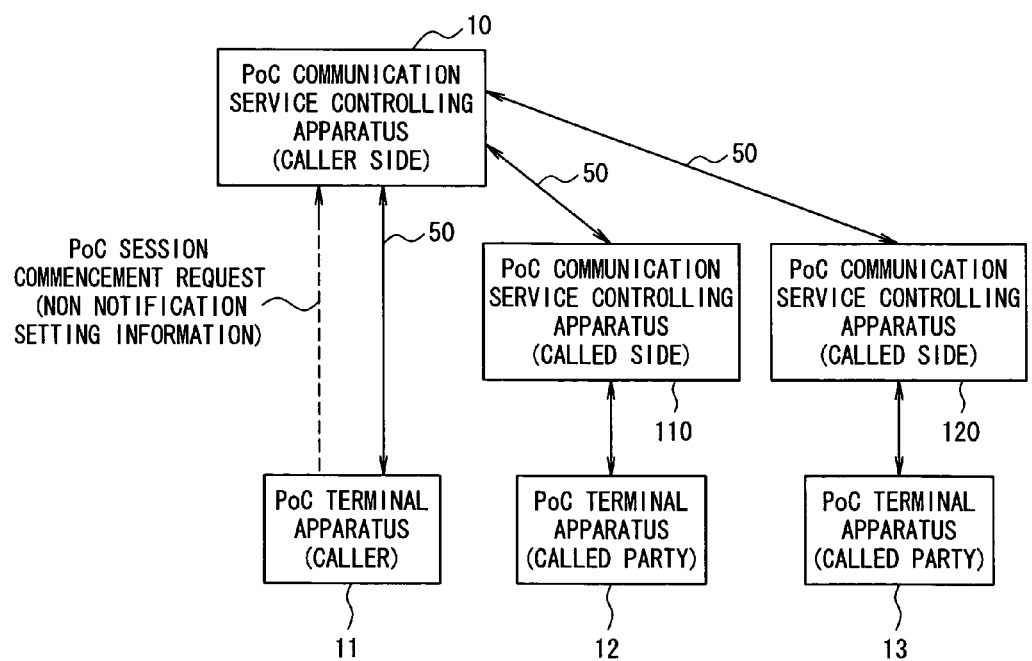
FIG. 17 is a conceptual drawing showing non notification processing in case of realizing PoC communication services with a plurality of PoC communication service controlling apparatuses.

In the example shown in FIG. 17, PoC communication service controlling apparatus is deployed at each communication service provider. That is, the PoC communication service controlling apparatuses 10, 110 and 120 are managed by mutually different communication service providers. And, the PoC terminal apparatus 11 is a subscriber of the communication service provider of the PoC communication service controlling apparatus 10, can therefore communicate with the PoC communication service controlling apparatus 10 and can communicate with the PoC communication service controlling apparatuses 110 and 120 of not subscribed communication service providers via the PoC communication service controlling apparatus 110 of the subscribed communication service provider.

The PoC terminal apparatus 12 is a subscriber of the communication service provider of the PoC communication service controlling apparatus 110, can therefore communicate with the PoC communication service controlling apparatus 110 and can communicate with the PoC communication service controlling apparatuses 10 and 120 of not subscribed communication service providers via the PoC communication service controlling apparatus 110 of the subscribed communication service provider. The PoC terminal apparatus 13 is a subscriber of the communication service provider of the PoC communication service controlling apparatus 120, can therefore communicate with the PoC communication service controlling apparatus 120 and can communicate with the PoC communication service controlling apparatuses 10 and 110 of not subscribed communication service providers via the PoC communication service controlling apparatus 120 of the subscribed communication service provider.

In such a case described above, when the PoC terminal apparatus 11 of the caller transmits a PoC session commencement request to the PoC terminal apparatus 12 and the PoC terminal apparatus 13 as the called parties, one (in the example hereof, the caller's) PoC communication service controlling apparatus 10 will become a base and the PoC communication service controlling apparatus 10 to become the base obtains non notification setting information respectively retained by the other (in the example hereof, the called parties') PoC communication service controlling apparatuses 110 and 120. One PoC communication service controlling apparatus becomes a base to gather non notification information retained by respective PoC communication service controlling apparatuses, and thereby a PoC session commencement request reflecting non notification information set by a caller and non notification information in accordance with presence of non notification on a self-terminal apparatus's address can be transmitted from the PoC communication service controlling apparatus to become the base to respective terminal apparatuses at the side of the respective called parties via the other PoC communication service controlling apparatuses.

In short, in the case where non notification setting information is managed over a plurality of PoC communication service controlling apparatuses, one of those apparatuses obtains non notification setting information from another apparatus and transmits it to a terminal apparatus, and then non notification processing can be realized also in case of realizing group talk among terminal apparatuses from different communication service providers.

Figure 18:
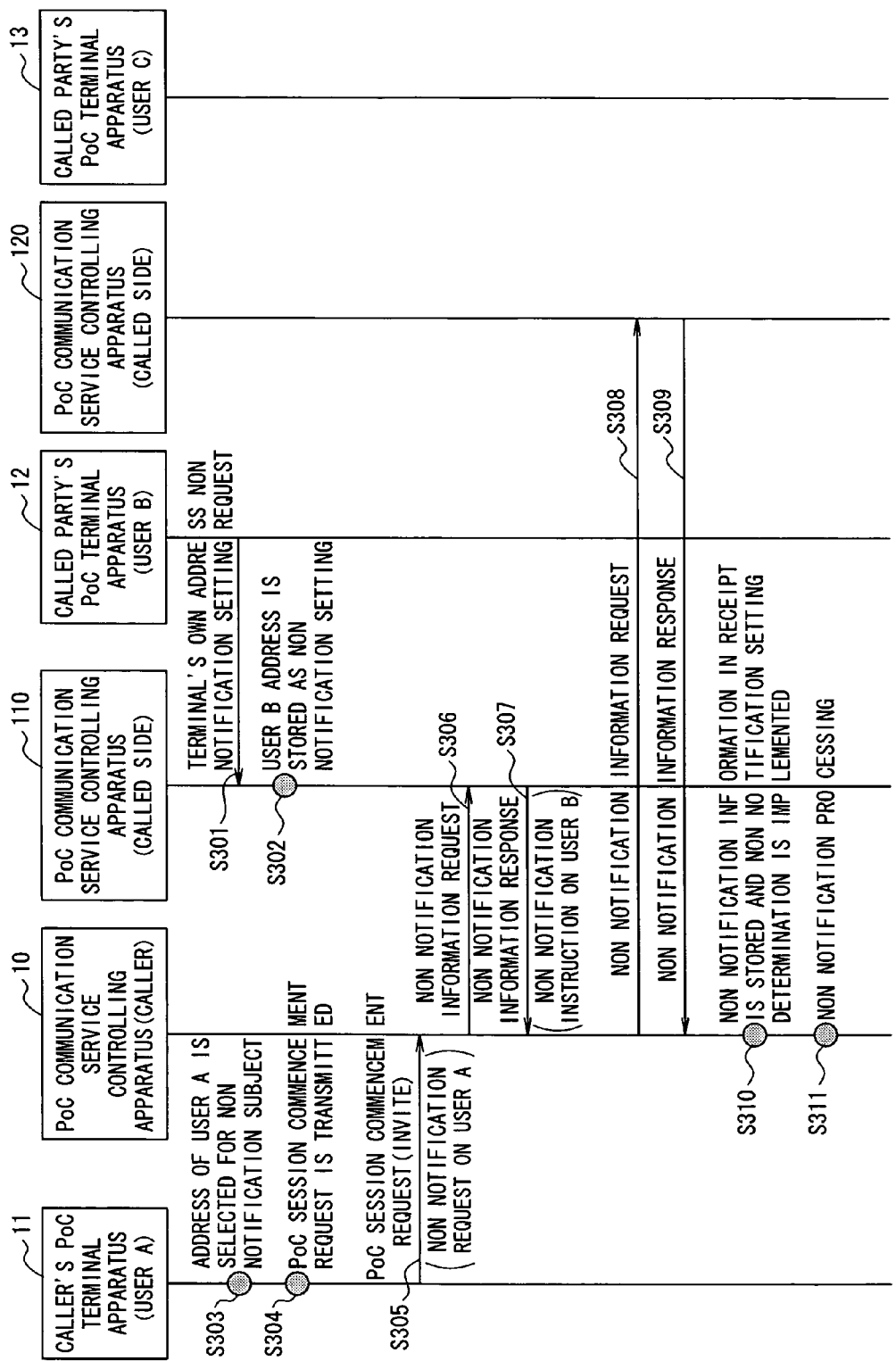
FIG. 18 is a part of a flow sequence showing an example of non notification processing in the case where non notification setting information is managed over a plurality of PoC communication server apparatuses in Case 1.
Figure 19:
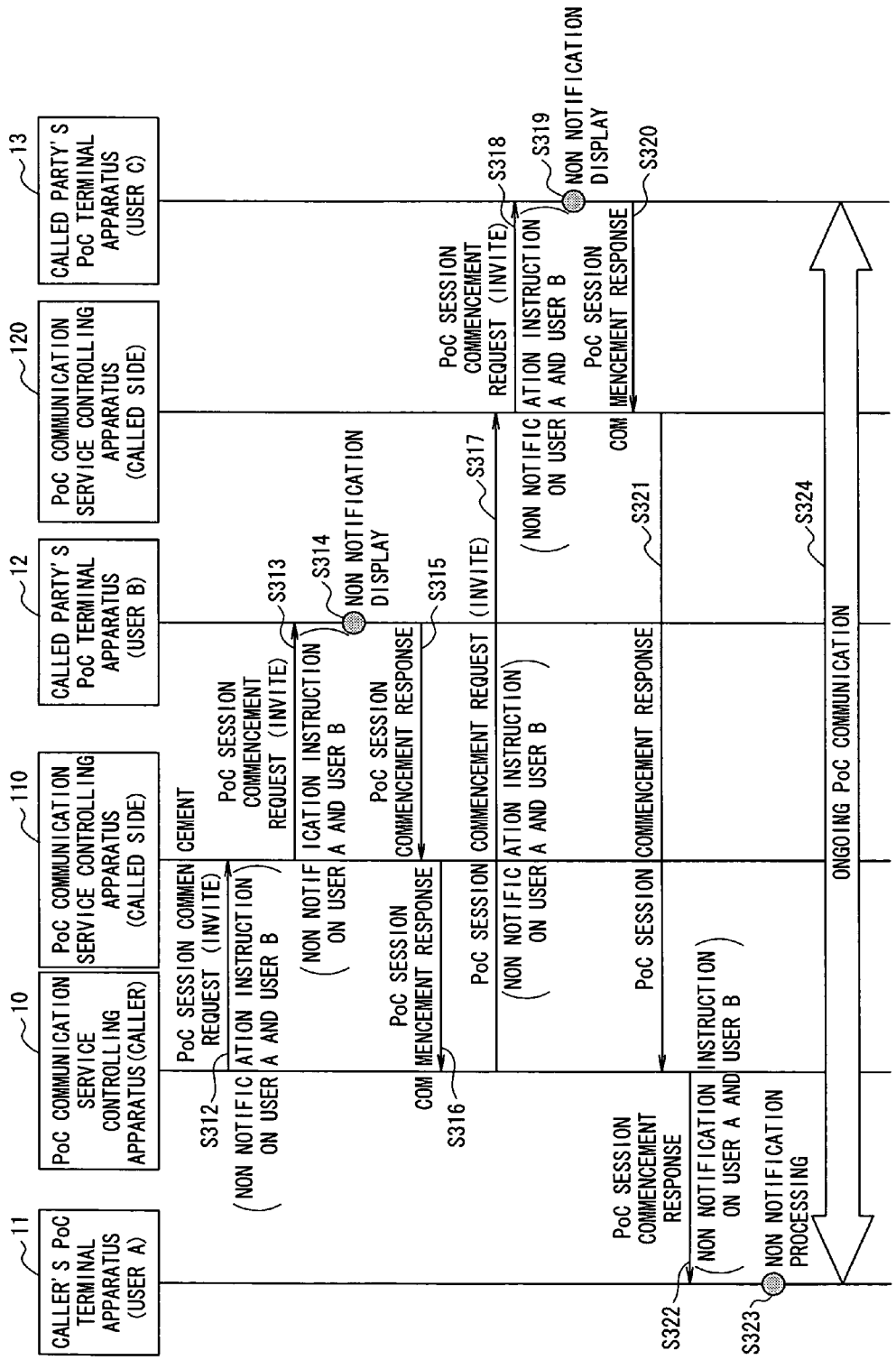
FIG. 19 is a part of a flow sequence showing an example of non notification processing in the case where non notification setting information is managed over a plurality of PoC communication server apparatuses in Case 1.

FIG. 18 as well as FIG. 19 is a flow sequence showing an example of non notification processing in the case where non notification setting information is managed over a plurality of PoC communication service controlling apparatuses in Case 1 described above, being a flow from a user B's address non notification request on his/her own terminal before transmission of a PoC session request up to establishment of a PoC session. In FIG. 18, when the user B being the called party of a PoC terminal apparatus 12 requests for non notification setting (Step S301) on his/her own terminal address, a PoC communication service controlling apparatus 110 stores that the address of the user B has been set to non notification (Step S302). Thus, an address non notification setting request of such a terminal can be sent out at any timing regardless of the state of PoC session establishment. However, until a PoC session is established, non notification setting on such terminal address is not made effective.

On the other hand, a PoC terminal apparatus 11 selects user addresses on a user A as non notification subject (Step S303) and transmits a PoC session commencement request (INVITE) (Step S304). This PoC session commencement request (INVITE) is transmitted to the PoC communication service controlling apparatus 10 (Step S305).

In order to confirm whether or not non notification is set on the user addresses of the user B and the user C at the called parties' sides, the PoC communication service controlling apparatus 10 transmits a non notification information request respectively to the PoC communication service controlling apparatuses 110 and 120 at the called parties' sides (Step S306, Step S308) and receives a non notification information response indicating whether or not non notification is set (Step S307, Step S309).

Next, the PoC communication service controlling apparatus 10 stores the non notification information in receipt with the PoC session commencement request (Step S305) and the non notification information response (Step S307, Step S309) to implement non notification setting determination (Step S310) and to implement non notification processing (Step S311).

Subsequently in FIG. 19, the PoC communication service controlling apparatus 10 transmits the PoC session commencement request (INVITE) to the PoC terminal apparatus 12 (Step S312). This PoC session commencement request (INVITE) is transmitted to the PoC terminal apparatus 12 via the PoC communication service controlling apparatus 110 at the called party's side (Step S313). The PoC terminal apparatus 12 in receipt of this PoC session commencement request (INVITE) undergoes non notification processing (Step S314) so that the user address of the user A and the user B are set to non notification. Thereafter, the PoC session commencement response is transmitted from the PoC terminal apparatus 12 to the PoC communication service controlling apparatus 10 via the PoC communication service controlling apparatus 110 (Step S315, Step S316).

The PoC communication service controlling apparatus 10 transmits the PoC session commencement request (INVITE) to the PoC terminal apparatus 13 (Step S317). This PoC session commencement request (INVITE) is transmitted to the PoC terminal apparatus 13 via the PoC communication service controlling apparatus 120 at the called party's side (Step S318). The PoC terminal apparatus 13 in receipt of this PoC session commencement request (INVITE) undergoes non notification processing (Step S319) so that the user address of the user A and the user B are set to non notification. Thereafter, the PoC session commencement response is transmitted from the PoC terminal apparatus 13 to the PoC communication service controlling apparatus 10 via the PoC communication service controlling apparatus 120 (Step S320, Step S321).

The PoC communication service controlling apparatus 10 in receipt of the PoC session commencement response from the PoC terminal apparatus 12 and the PoC terminal apparatus 13 transmits the PoC session commencement response to the PoC terminal apparatus 11 (Step S322). Thereby the PoC terminal apparatus 11 undergoes non notification processing on the user addresses of the user A and the user B (Step S323). The PoC terminal apparatus 13 does not undergo non notification processing since its user address (user C) is not set to non notification. Thereafter the PoC terminal apparatuses 11 to 13 will enter PoC communication state (Step S324).

Figure 20:
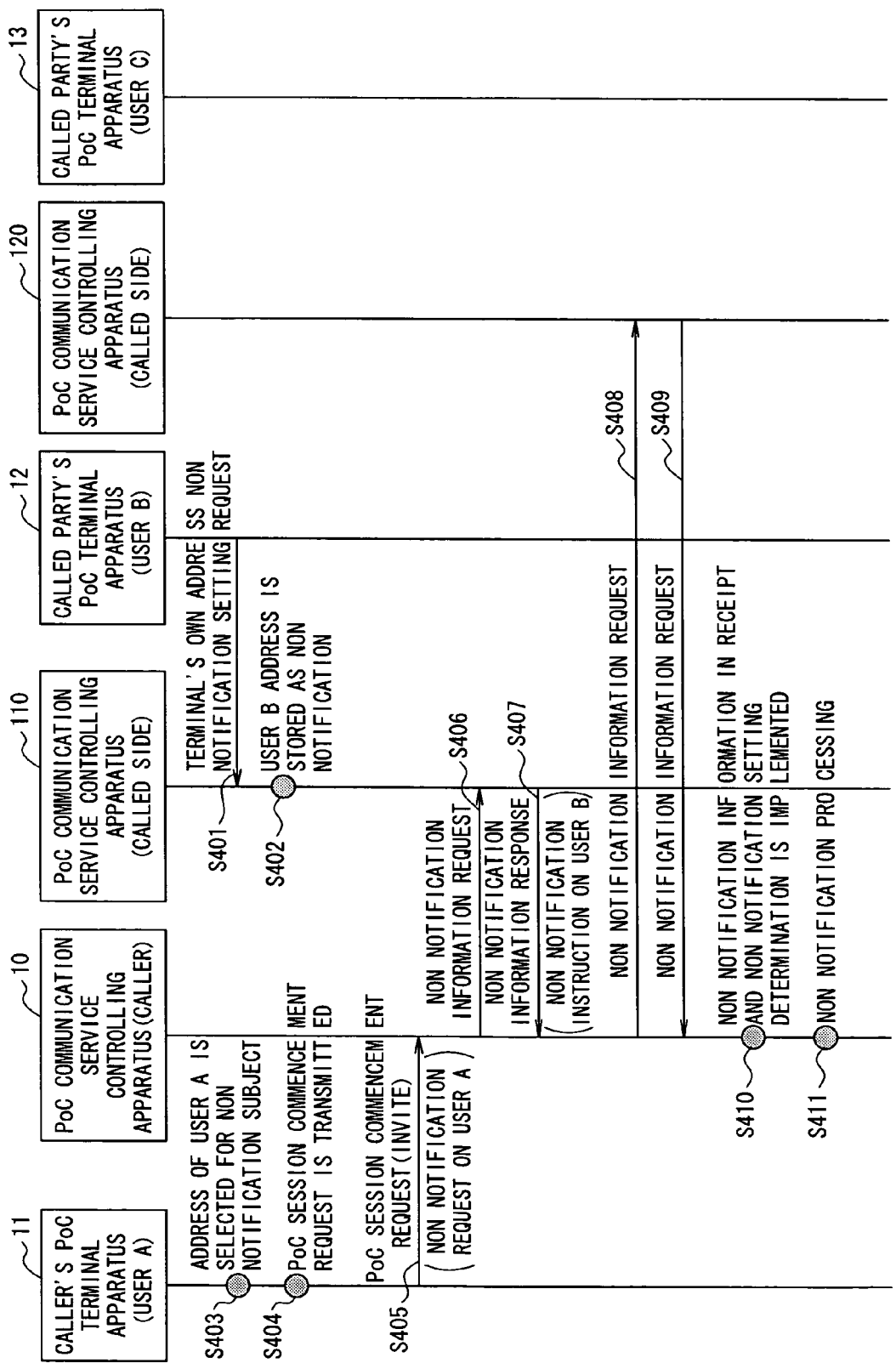
FIG. 20 is a part of a flow sequence showing an example of non notification processing in the case where non notification setting information is managed over a plurality of PoC communication server apparatuses in Case 3.
Figure 21:
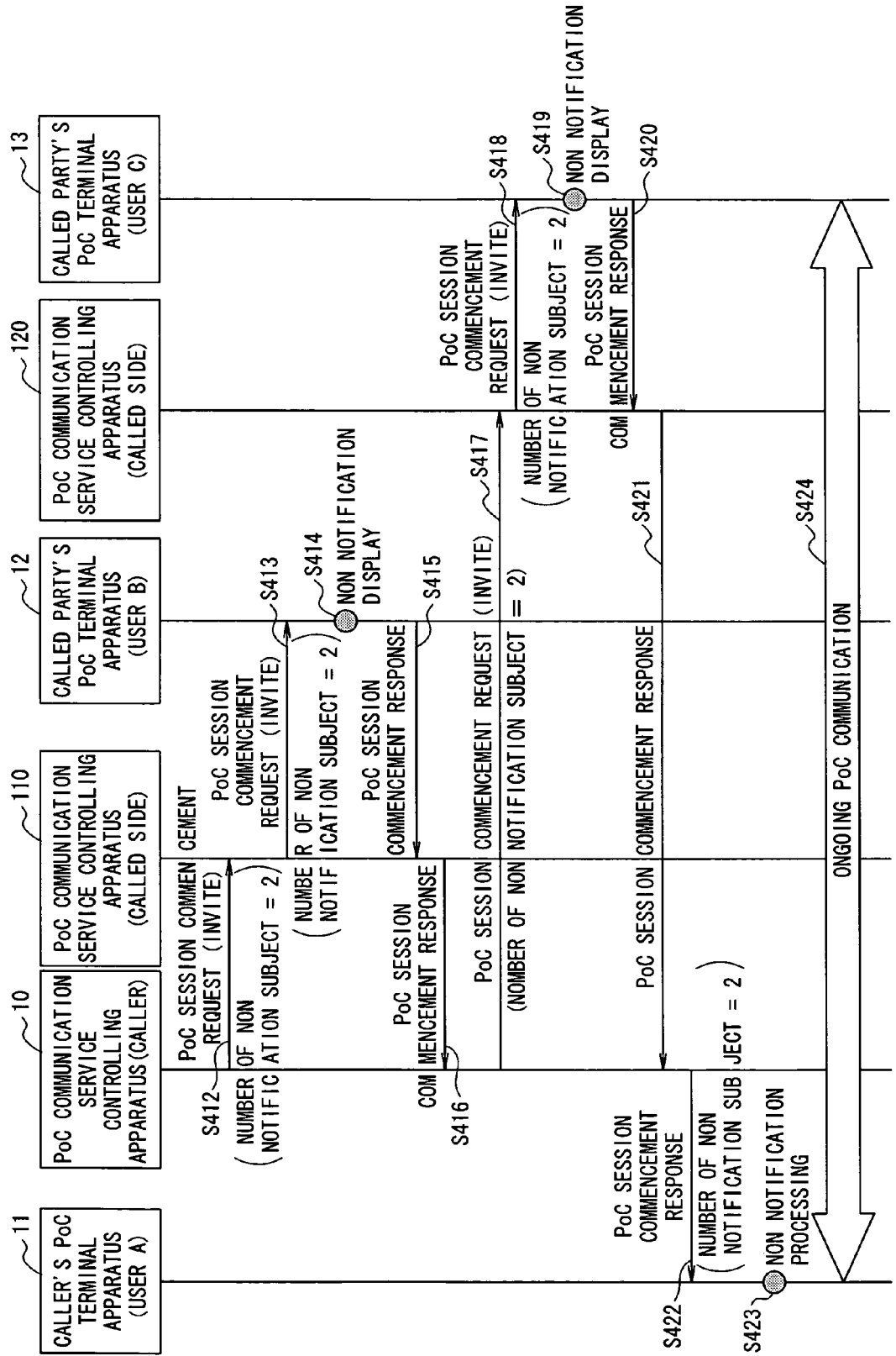
FIG. 21 is a part of a flow sequence showing an example of non notification processing in the case where non notification setting information is managed over a plurality of PoC communication server apparatuses in Case 3.

FIG. 20 as well as FIG. 21 is a flow sequence showing an example of non notification processing in the case where non notification setting information is managed over a plurality of PoC communication service controlling apparatuses in Case 3 described above, being a flow from a user B's address non notification request on his/her own terminal before transmission of a PoC session request up to establishment of a PoC session. In FIG. 20, when the user B being the called party of a PoC terminal apparatus 12 requests for non notification setting (Step S401) on his/her own terminal, a PoC communication service controlling apparatus 110 stores that the address of the user B has been set to non notification (Step S402). Thus, a terminal's own address non notification setting request can be sent out at any timing regardless of the state of PoC session establishment. However, until a PoC session is established, non notification setting on such terminal address is not made effective.

On the other hand, a PoC terminal apparatus 11 selects user addresses on a user A as non notification subject (Step S403) and transmits a PoC session commencement request (INVITE) (Step S404). This PoC session commencement request (INVITE) is transmitted to the PoC communication service controlling apparatus 10 (Step S405).

In order to confirm whether or not non notification is set on the user addresses of the user B and the user C at the called parties' sides, the PoC communication service controlling apparatus 10 transmits a non notification information request respectively to the PoC communication service controlling apparatuses 110 and 120 at the called parties' sides (Step S406, Step S408) and receives a non notification information response indicating whether or not non notification is set (Step S407, Step S409).

Next, the PoC communication service controlling apparatus 10 stores the non notification information in receipt with the PoC session commencement request (Step S405) and the non notification information response (Step S407, Step S409) to implement non notification setting determination (Step S410) and to implement non notification processing (Step S411).

Subsequently in FIG. 21, the PoC communication service controlling apparatus 10 transmits the PoC session commencement request (INVITE) to the PoC terminal apparatus 12 (Step S412). At that time, on the user addresses set to non notification, the value of the number of the subject thereof is transmitted. In the example hereof, "2" is transmitted as the number of non notification subjects. This PoC session commencement request (INVITE) is transmitted to the PoC terminal apparatus 12 via the PoC communication service controlling apparatus 110 at the called party's side (Step S413). The PoC terminal apparatus 12 in receipt of this PoC session commencement request (INVITE) undergoes non notification processing (Step S414). In the example hereof, on the user A as well as the user B, user addresses are not displayed but "non notification" is displayed instead. Thereafter, the PoC session commencement response is transmitted from the PoC terminal apparatus 12 to the PoC communication service controlling apparatus 10 via the PoC communication service controlling apparatus 110 (Step S415, Step S416).

The PoC communication service controlling apparatus 10 transmits the PoC session commencement request (INVITE) to the PoC terminal apparatus 13 (Step S417). At that time, likewise described above, on the user addresses set to non notification, the value of the number of the subject thereof is transmitted. In the example hereof, "2" is transmitted as the number of non notification subjects. This PoC session commencement request (INVITE) is transmitted to the PoC terminal apparatus 13 via the PoC communication service controlling apparatus 120 at the called party's side (Step S418). The PoC terminal apparatus 13 in receipt of this PoC session commencement request (INVITE) undergoes non notification processing (Step S419). In the example hereof, on the user A as well as the user B, user addresses are not displayed but "non notification" is displayed instead. Thereafter, the PoC session commencement response is transmitted from the PoC terminal apparatus 13 to the PoC communication service controlling apparatus 10 via the PoC communication service controlling apparatus 120 (Step S420, Step S421).

The PoC communication service controlling apparatus 10 in receipt of the PoC session commencement response from the PoC terminal apparatus 12 and the PoC terminal apparatus 13 transmits the PoC session commencement response to the PoC terminal apparatus 11 (Step S422). Thereby the PoC terminal apparatus 11 undergoes non notification processing on the user addresses of the user A and the user B (Step S423). The PoC terminal apparatus 13 does not undergo non notification processing since its user address (user C) is not set to non notification. Thereafter the PoC terminal apparatuses 11 to 13 will enter PoC communication state (Step S424).

Figure 22:
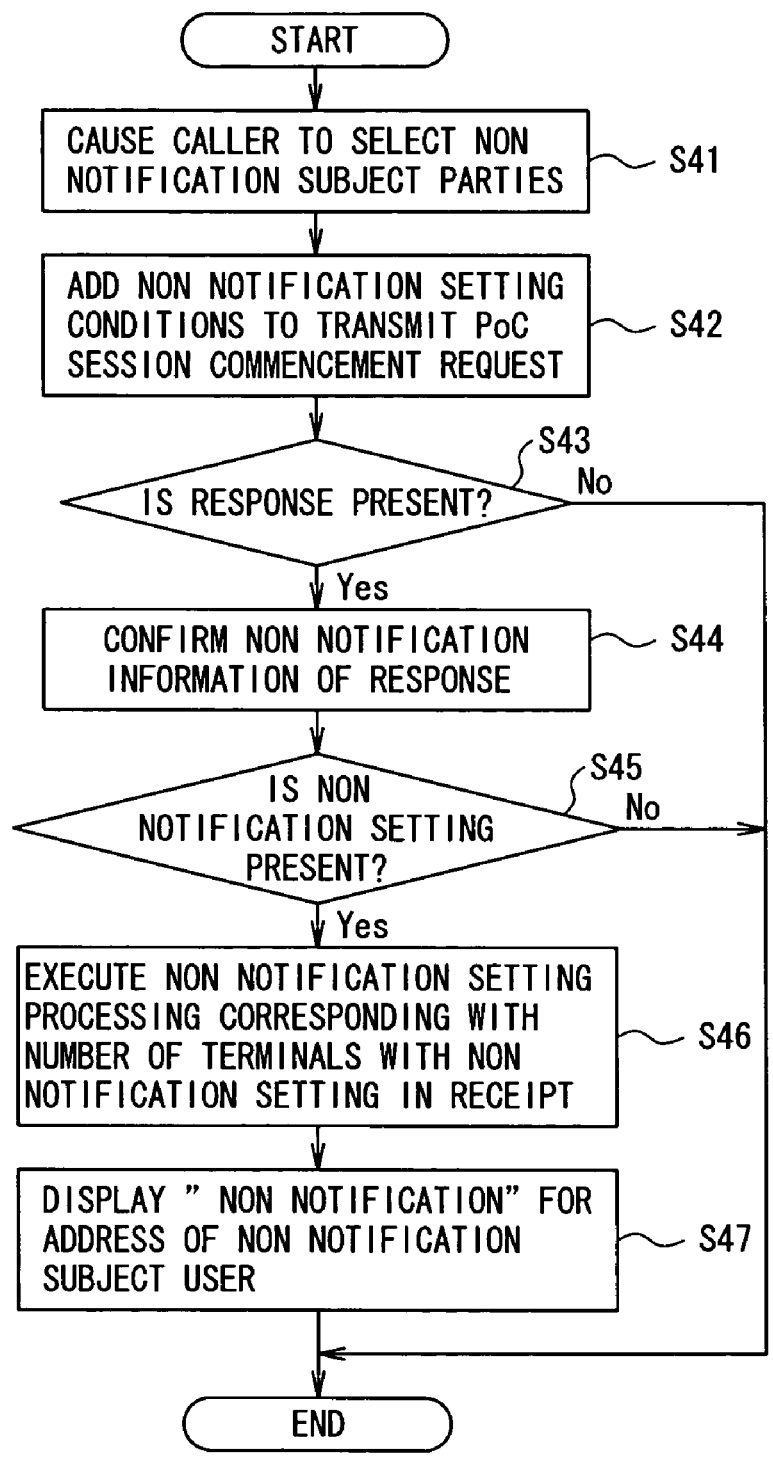
FIG. 22 is a flow chart showing an operation example of a terminal apparatus of each PoC session caller in case of FIG. 20 and FIG. 21.

FIG. 22 is a flow chart showing an operation example of a terminal apparatus of a PoC session caller in case of the above described FIG. 20 as well as FIG. 21. In FIG. 22, at first, a PoC session caller operates a terminal apparatus to select non notification subject parties (Step S41). Adding non notification setting condition, it transmits a PoC session commencement request (Step S42).

Thereafter, when there is a response from the PoC communication service controlling apparatus, contents of the non notification information as well as the value of a number of non notification subject users included in that response are confirmed (from Step S43 to Step S44). As a result of this confirmation, if non notification is set, non notification setting processing corresponding with the number of terminals with the non notification setting in receipt is executed (from Step S45 to Step S46). This sets the address of non notification subject user to "non notification" (Step S47).

In case of no response in Step S43 and in the case where non notification is not set in Step S45, processing will directly come to an end.

Figure 23:
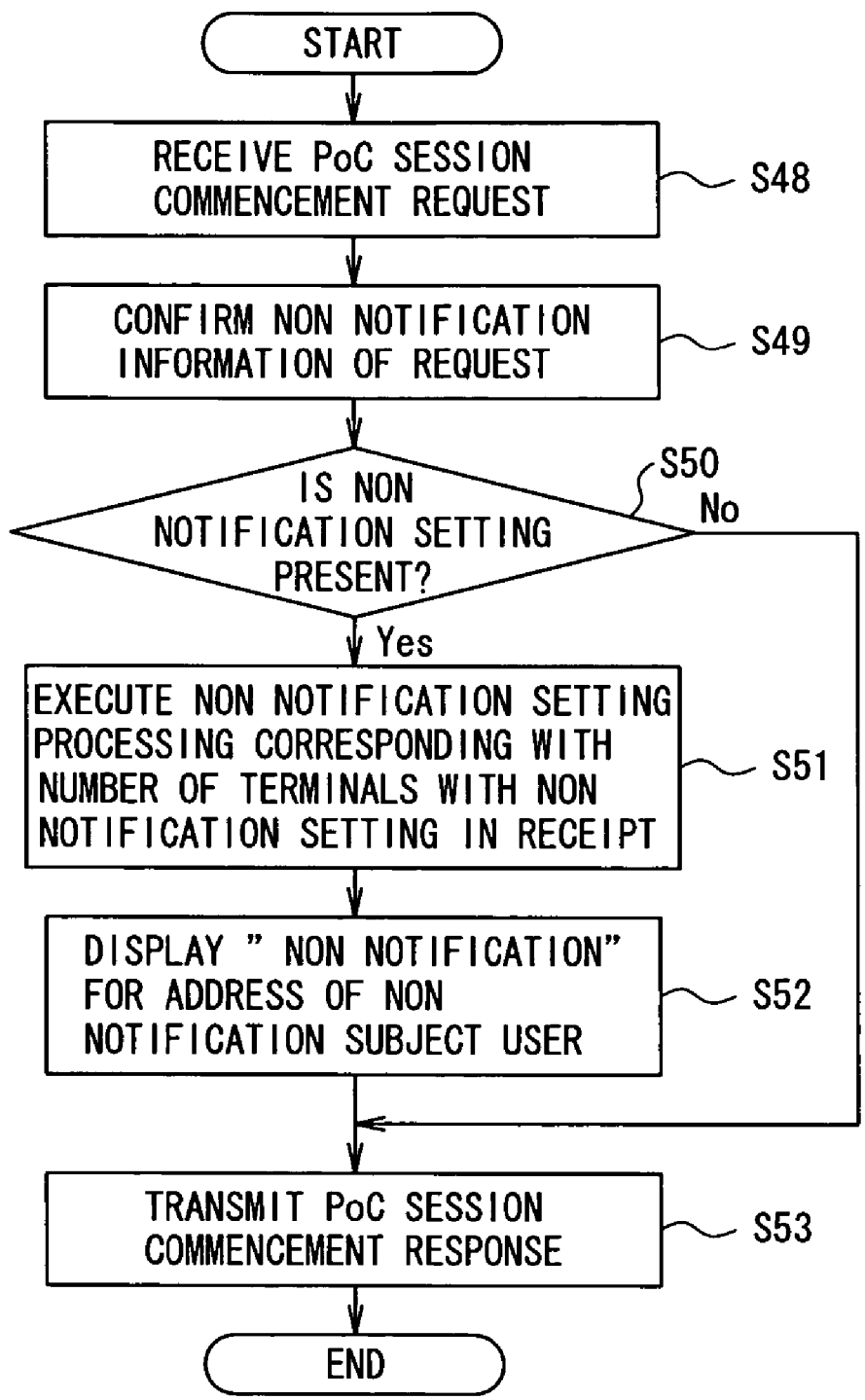
FIG. 23 is a flow chart showing an operation example of a terminal apparatus of each PoC session reception in case of FIG. 20 and FIG. 21.

FIG. 23 is a flow chart showing an operation example of a PoC session called party's terminal apparatus in case of the above described FIG. 20 as well as FIG. 21. In FIG. 23, upon receipt of a PoC session commencement request from a PoC session caller's terminal apparatus (Step S48), contents of non notification information as well as the value of a number of non notification subject users included in that request are confirmed (Step S49). As a result of this confirmation, if non notification is set, non notification setting processing corresponding with the number of terminals with the non notification setting in receipt is executed (Step S50 to Step S51). This sets the address of non notification subject user to "non notification" (Step S52).

When non notification display is completed in the called party's terminal apparatus, a PoC session commencement response is transmitted to the PoC communication service controlling apparatus (Step S53).

As a result of confirmation in Step S49, if non notification is not set, the PoC session commencement response is transmitted directly (Step S50 to Step S53).

Figure 24:
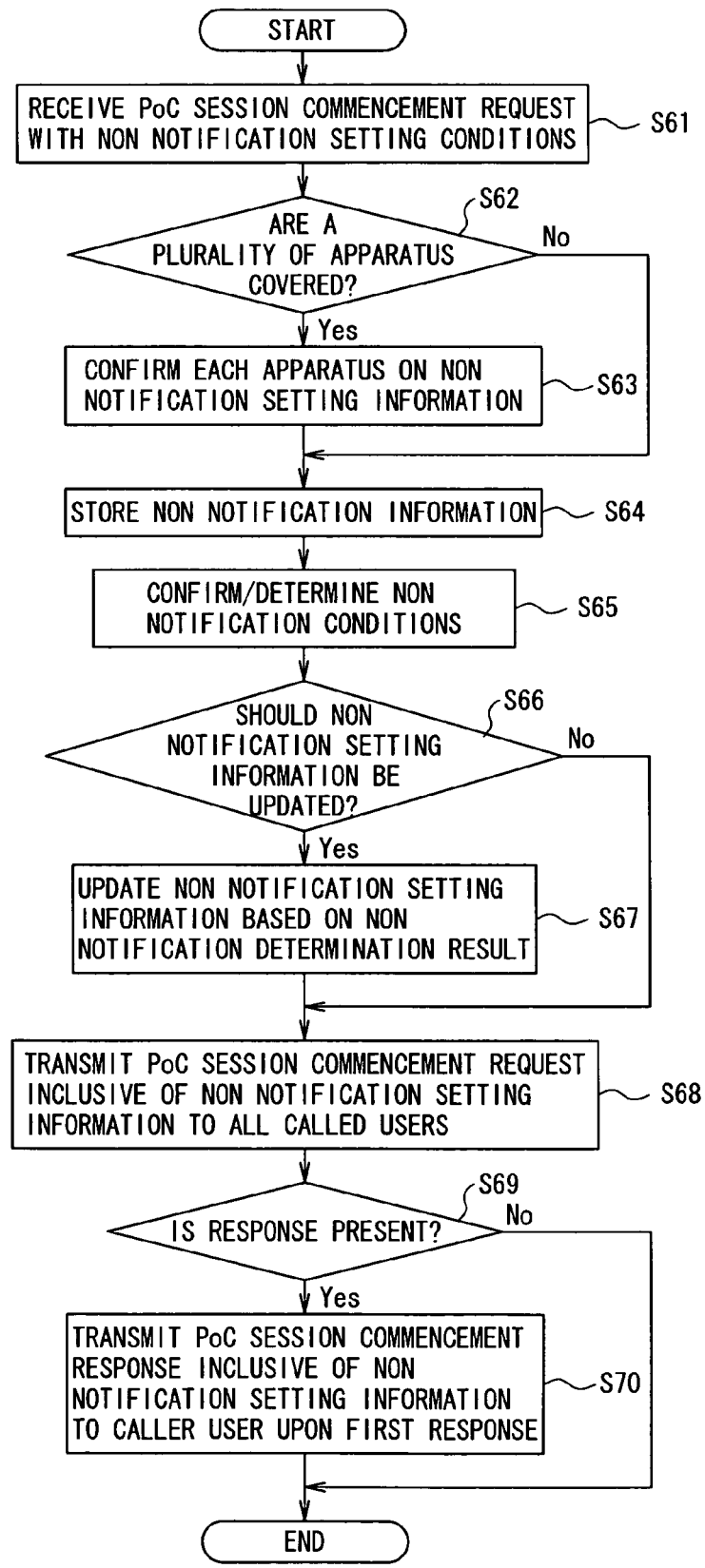
FIG. 24 is a flow chart of showing a non notification setting operation example of a PoC communication server apparatus at the time of transmitting/receiving a PoC session commencement request/response in FIG. 20 and FIG. 21.

FIG. 24 is a flow chart of showing a non notification setting operation example of a PoC communication service controlling apparatus at the time of transmitting/receiving a PoC session commencement request/response in the above described FIG. 20 and FIG. 21. In FIG. 24, upon receipt of a PoC session commencement request with non notification setting conditions (Step S61), it is determined whether or not non notification setting information on a user address of a PoC terminal apparatus designated as a member of group talk is managed over a plurality of PoC communication service controlling apparatuses (Step S62). In the case where it is managed over a plurality of PoC communication service controlling apparatuses, a non notification setting information request is transmitted to other PoC communication service controlling apparatuses so that non notification setting information on the user address of the PoC terminal apparatus is confirmed and a non notification command inclusive of non notification setting information is obtained (Step S63) In the case where the non notification setting information is not managed over a plurality of PoC communication service controlling apparatuses, non notification setting information request to the other PoC communication service controlling apparatuses is not transmitted.

Thereafter, the PoC communication service controlling apparatus stores non notification conditions included in the response to the PoC session commencement request as well as the non notification setting information request (Step S64). Thereafter, the non notification conditions undergo confirmation and determination (Step S65).

And, in the case where the non notification setting information needs to undergo updating, after the non notification setting information undergoes updating based on the non notification determination result (Step S66 to Step S67), a PoC session commencement request inclusive of non notification setting information is transmitted to all the called users (Step S68). On the other hand, in the case where the non notification setting information does not need to undergo updating, without any updating, the PoC session commencement request inclusive of non notification setting information is transmitted to all the called users (Step S66 to Step S68).

With successful receipt of at least one PoC session commencement response, the PoC communication service controlling apparatus adds, to the PoC session commencement response, non notification setting information similar to that transmitted to the called party and transmits it to the caller's terminal apparatus (Step S69 to Step S70). In case of no response from the called user, processing will directly come to an end.

(PoC Communication Method)

In the above described PoC communication system, a PoC communication method as will be described below is realized. That is, there realized is a PoC communication method of carrying out a PoC group session of realizing group talk with a terminal apparatus, including a non notification command obtaining step of obtaining non notification command for employing non notification on a user address corresponding with a terminal apparatus included in the above described PoC group and a non notification setting step of transmitting to another terminal apparatus a non notification setting command for setting non notification onto a user address related to the above described non notification command obtained by the above described non notification command obtaining step against the another terminal apparatus included in the PoC group. With such a configuration, user addresses of all members of a group or a part of a group can be hidden from all the group members (set to non notification).

And, in the above described non notification command obtaining step, any one of apparatuses among a plurality of apparatuses obtains the above described non notification command inclusive of the above described non notification setting information from another apparatus in the case where non notification setting information indicating whether or not respective user addresses of terminal apparatuses included in the above described PoC group are set to non notification is managed over a plurality of apparatuses thereof. Thus, in the case where non notification setting information is managed over a plurality of PoC communication service controlling apparatuses, one of those apparatuses obtains non notification setting information from another apparatus and transmits it to a terminal apparatus, and then non notification processing can be realized also in case of realizing group talk among terminal apparatuses from different communication service providers.

In addition, the above described non notification setting command is occasionally transmitted, prior to commencement of the above described PoC group session, from a terminal apparatus desired to be set to non notification. Thereby, prior to commencement of the PoC group session, a terminal apparatus to become a called party can set itself to non notification.

Moreover, there are a lot of cases where the above described non notification setting command is transmitted from a terminal apparatus at a caller side at the time of commencement of the above described PoC group session. Thereby, any user address within a group can be set to non notification at the time of commencement of the PoC group session.

There is also a case where the above described non notification setting command is transmitted from a terminal apparatus during communication by means of the above described PoC group session. Thereby, a user address that has been notified at the time of commencement of the PoC group session can be changed to non notification setting thereafter.

Moreover, the above described non notification setting command includes, for example, a user address and an identifier of indicating whether or not the above described user address is set to non notification. The terminal apparatus can be caused to display contents indicative of non notification on a user address by means of transmitting together with the user address an identifier indicating whether or not to set it to non notification.

In addition, the above described non notification setting command may include a user address and DISPLAYNAME information indicating contents to be displayed, instead of the above described user address, in display windows of respective terminal apparatuses. Not displaying the user address but by transmitting the contents to be displayed instead, the terminal apparatus will only have to display those contents.

The above described non notification setting command does not include a user address corresponding with a terminal apparatus included in the above described PoC group but may include information indicative of a number of terminal apparatus set to non notification setting. Since a user address on a notification subject user is transmitted while a user address itself on a non notification subject user is not transmitted, a waste of network resources can be prevented.

(Recapitulation)

As described above, in the system hereof, in case of having received a non notification setting message as a response to a non notification request on its own terminal's address, the address of the non notification subject is displayed so as not to be visible from respective users based on information included in the non notification setting message. And, according to which system, Case 1 or Case 2, the system has adopted, non notification information included in non notification setting message is different (see FIG. 1B and FIG. 2B) and processing corresponding with the non notification information is implemented.

In addition, the system hereof has two modes for a PoC communication service controlling apparatus to receive non notification setting request. One of them is a case of having received a PoC session commencement request transmitted from a terminal apparatus at the time of starting a PoC session and the other of them is a case of having received a request transmitted at the time when each user sets his/her own (his/her own terminal's) user address to non notification. Storing the non notification information included in these requests with a PoC communication service controlling apparatus, it can be determined which user address should be set to non notification.

The PoC communication service controlling apparatus is requested to set such user address to non notification with either one of methods of a PoC session commencement request or a terminal's non notification setting on its own address and then sets it to non notification. In addition, non notification setting due to a PoC session commencement request is not changed until the caller user gets out of the PoC session. An object thereof is to prevent a user address set to non notification by a caller at the time of the PoC session commencement from being changed from a non notification state to a notification state freely at intention of a user other than the caller even if a terminal apparatus should comprise a function of notifying user addresses explicitly. With these determination criteria it is possible to always understand the non notification state with the PoC communication service controlling apparatus to update the non notification setting information. Therefore, until the caller gets out of the session, non notification setting shown in FIG. 10 can be consequently realized.

In addition, with regard to a terminal set to non notification setting not transmitting user addresses but transmitting information indicative of a number of terminals thereon instead, and then since user addresses themselves on non notification subject users are not transmitted, a waste of network resources can be prevented.

In the case where non notification setting information is managed over a plurality of apparatuses, one of a plurality of apparatuses thereof obtains non notification setting information from another apparatus and transmits it to a terminal apparatus, and then non notification processing can be realized also in case of realizing group talk among terminal apparatuses from different communication service providers.

(Other Modes on Description in Claims)

With regard to description on claims, the present invention can further adopt the following modes.

(1) A PoC communication system of carrying out a PoC group session of realizing group talk with a terminal apparatus, including non notification command obtaining means for obtaining non notification command for employing non notification on a user address corresponding with a terminal apparatus included in the above described PoC group and non notification setting means for transmitting to another terminal apparatus a non notification setting command for setting non notification onto a user address related to the above described non notification command obtained by the above described non notification command obtaining means against the another terminal apparatus included in the above described PoC group. With such a configuration, user addresses of all members of a group or a part of users can be hidden from all the group members (set to non notification).

(2) The PoC communication system according to item (1), wherein the above described non notification setting command is transmitted, prior to commencement of the above described PoC group session, from a terminal apparatus desired to be set to non notification. With such a configuration, prior to commencement of the PoC group session, a terminal apparatus to become a called party can set itself to non notification.

(3) The PoC communication system according to item (1), wherein the above described non notification setting command is transmitted from a terminal apparatus at a caller side at the time of commencement of the above described PoC group session. With such a configuration, any user address within a group can be set to non notification at the time of commencement of the PoC group session.

(4) The PoC communication system according to item (1), wherein the above described non notification setting command is transmitted from a terminal apparatus during communication by means of the above described PoC group session. With such a configuration, a user address that has been notified at the time of commencement of the PoC group session can be changed to non notification setting thereafter.

(5) The PoC communication system according to any one of items (1) to (4), wherein
the above described non notification setting command includes a non notification identifier indicative of setting the user address to non notification
the above described non notification setting means does not display the above described user address in the case where contents of the above described non notification identifier are indicative of setting the user address to non notification. With such a configuration, in utilization of a sophisticated terminal apparatus, user addresses of all members of a group or a part of a group can be hidden from all the group members (set to non notification).

(6) The PoC communication system according to any one of items (1) to (4), wherein
the above described non notification setting command includes display contents to be displayed on the screen on the terminal apparatus
the above described non notification setting means overwrite the above described display contents with contents indicative of non notification. With such a configuration, in utilization of a sophisticated PoC communication service controlling apparatus, user addresses of all members of a group or a part of a group can be hidden from all the group members (set to non notification).

The present invention can be utilized in case of realizing PoC communication in utilization of a terminal apparatus like a transceiver.

What is claimed is:

1. A PoC (Push-to-talk over Cellular) communication server apparatus for carrying out a session for a PoC group to realize group talk between terminal apparatuses, the PoC communication server apparatus comprising:
non notification command obtaining means for obtaining a non notification command for hiding a user address of a terminal apparatus of a user included in said PoC group from another terminal apparatus of another user in the PoC group; and
non notification setting means for transmitting to another terminal apparatus of another user a non notification setting command for hiding the user address of the terminal apparatus of the user related to said non notification command obtained by said non notification command obtaining means from the another terminal apparatus included in said PoC group;
wherein said non notification setting command is transmitted at a predetermined timing including at least one of: prior to commencement of the session from a terminal apparatus the user address of which is desired to be hidden; from a terminal apparatus at a caller side at the time of the commencement of the session; and from a terminal apparatus during communication in the session; and
wherein at least one of the non notification setting command for hiding the user address of the terminal apparatus of the user and another non notification setting command of hiding another user address of another terminal apparatus of another user is transmitted to a terminal apparatus included in the PoC group in an INVITE message that is a PoC session commencement request.

2. The PoC communication server apparatus according to claim 1, wherein said non notification command obtaining means obtains said non notification command inclusive of non notification setting information from another apparatus in a case where the non notification setting information indicating whether or not each of the user addresses of the terminal apparatuses included in said PoC group is set to non notification is managed by a plurality of apparatuses.

3. The PoC communication server apparatus according to claim 1, wherein said non notification setting command includes the user address and an identifier of indicating whether or not said user address is set to the non notification of hiding the user address from another terminal apparatus of another user in the PoC group.

4. The PoC communication server apparatus according to claim 1, wherein said non notification setting command includes the user address and display name information indicating a content to be displayed, instead of said user address, in a display window of each of the terminal apparatuses.

5. The PoC communication server apparatus according to claim 1, wherein said non notification setting command does not include the user address of the terminal apparatus included in said PoC group but includes information indicative of the number of terminal apparatuses set to the non notification.

6. A terminal apparatus for carrying out a session for a PoC (Push-to-talk over Cellular) group to realize group talk with another terminal apparatus, the terminal apparatus comprising:
non notification command transmitting means for transmitting a non notification setting command for hiding a user address of the terminal apparatus from another terminal apparatus of another user included in said PoC group;
wherein said non notification setting command is transmitted at a predetermined timing including at least one of: prior to commencement of the session from a terminal apparatus the user address of which is desired to be hidden; from a terminal apparatus at a caller side at the time of the commencement of the session; and from a terminal apparatus during communication in the session; and
wherein at least one of the non notification setting command for hiding the user address of the terminal apparatus of the user and another non notification setting command of hiding another user address of another terminal apparatus of another user is transmitted to a terminal apparatus included in the PoC group in an INVITE message that is a PoC session commencement request.

7. A terminal apparatus, of a user having a user address for carrying out a session for a PoC (Push-to-talk over Cellular) group to realize group talk with another terminal apparatus of another user having another user address, the terminal apparatus comprising:

display controlling means for displaying, in the terminal apparatus of the user, a content indicative of non notification of hiding another user address of another terminal apparatus of another user, in reception of a non notification setting command for hiding said another user address of the another terminal apparatus of said another user included in said PoC group;

wherein said non notification setting command is transmitted at a predetermined timing including at least one of: prior to commencement of the session from a terminal apparatus the user address of which is desired to be hidden; from a terminal apparatus at a caller side at the time of the commencement of the session; and from a terminal apparatus during communication in the session; and wherein at least one of the non notification setting command for hiding the user address of the terminal apparatus of the user and another non notification setting command of hiding another user address of another terminal apparatus of another user is transmitted to a terminal apparatus included in the PoC group in an INVITE message that is a PoC session commencement request.

8. The terminal apparatus according to claim 7, wherein said non notification setting command includes the user address and an identifier of indicating whether or not said user address is set to the non notification and said display controlling means displays that the non notification is set to the user address according to the identifier.

9. The terminal apparatus according to claim 7, wherein said non notification setting command includes the user address and display name information indicating a content to be displayed, instead of said user address, in a display window of each of the terminal apparatuses and said display controlling means displays the content of said display name information.

10. The terminal apparatus according to claim 7, wherein said non notification setting command does not include the user address of the terminal apparatus included in said PoC group but includes information indicative of the number of terminal apparatuses set to the non notification; and wherein said display controlling means displays the non notification corresponding with the number of said terminal apparatuses.

11. A PoC (Push-to-talk over Cellular) communication method of carrying out a session for a PoC group to realize group talk between terminal apparatuses, the method comprising:

obtaining a non notification command for hiding a user address of a terminal apparatus of a user from another terminal apparatus of another user included in said PoC group; and transmitting to another terminal apparatus of another user a non notification setting command for hiding the user address of the terminal apparatus of the user related to said non notification command obtained in by the obtaining step from the another terminal apparatus included in said PoC group;

wherein said non notification setting command is transmitted at a predetermined timing including at least one of: prior to commencement of the session from a terminal apparatus the user address of which is desired to be hidden; from a terminal apparatus at a caller side at the time of the commencement of the session; and from a terminal apparatus during communication in the session; and wherein at least one of the non notification setting command for hiding the user address of the terminal apparatus of the user and another non notification setting command of hiding another user address of another terminal apparatus of another user is transmitted to a terminal apparatus included in the PoC group in an INVITE message that is a PoC session commencement request.

12. The PoC communication method according to claim 11, wherein in the obtaining step, any one of a plurality of apparatuses obtains said non notification command inclusive of information on non notification setting from another apparatus in a case where the information on the non notification setting indicating whether or not each of the user addresses of the terminal apparatuses included in said PoC group is set to non notification is managed by a plurality of apparatuses.

13. The PoC communication method according to claim 11, wherein said non notification setting command includes the user address and an identifier of indicating whether or not said user address is set to non notification of hiding the user address from another user.

14. The PoC communication method according to claim 11, wherein said non notification setting command includes the user address and display name information indicating a content to be displayed, instead of said user address, in a display window of each of the terminal apparatuses.

15. The PoC communication method according to claim 11, wherein said non notification setting command does not include a user address of a terminal apparatus included in said PoC group but includes information indicative of the number of terminal apparatuses set to the non notification of hiding the user address from another user.

* * * * *